US011350011B2

(12) United States Patent
Inoue

(10) Patent No.: US 11,350,011 B2
(45) Date of Patent: May 31, 2022

(54) DEVICE, PROCESS EXECUTION SYSTEM, PROCESS EXECUTION METHOD, AND NON-TRANSITORY RECORDING MEDIUM

(71) Applicant: Ricoh Company, Ltd., Tokyo (JP)

(72) Inventor: Yuusuke Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/159,251

(22) Filed: Jan. 27, 2021

(65) Prior Publication Data

US 2021/0258448 A1 Aug. 19, 2021

(30) Foreign Application Priority Data

Feb. 14, 2020 (JP) .............................. JP2020-023801

(51) Int. Cl.
H04N 1/387 (2006.01)
H04N 1/00 (2006.01)
H04N 1/04 (2006.01)
H04N 1/393 (2006.01)

(52) U.S. Cl.
CPC ......... *H04N 1/3873* (2013.01); *H04N 1/0044* (2013.01); *H04N 1/0449* (2013.01); *H04N 1/393* (2013.01)

(58) Field of Classification Search
CPC .. H04N 1/3873; H04N 1/0044; H04N 1/0449; H04N 1/393; H04N 1/387
See application file for complete search history.

(56) References Cited

U.S. PATENT DOCUMENTS

| 8,688,579 | B1* | 4/2014 | Ethington | G06Q 20/386 705/42 |
| 9,129,340 | B1* | 9/2015 | Medina, III | G06T 7/12 |
| 2008/0100885 | A1* | 5/2008 | Onishi | H04N 1/0044 358/488 |
| 2009/0122341 | A1* | 5/2009 | Natori | H04N 1/00867 358/1.15 |
| 2010/0277772 | A1* | 11/2010 | Destree | G06V 30/40 358/448 |
| 2012/0226990 | A1* | 9/2012 | Nakashima | H04N 1/00244 715/738 |
| 2015/0304510 | A1* | 10/2015 | Matsutani | H04N 1/00307 358/434 |
| 2016/0241724 | A1* | 8/2016 | Sugimura | H04N 1/00962 |
| 2017/0102906 | A1* | 4/2017 | Shimomoto | G06Q 10/06 |

(Continued)

FOREIGN PATENT DOCUMENTS

| JP | 2015-204075 | 11/2015 |
| JP | 2016-154000 | 8/2016 |

OTHER PUBLICATIONS

Extended European Search Report dated Jul. 29, 2021 in European Patent Application No. 21154086.9, 10 pages.

*Primary Examiner* — Ted W Barnes
(74) *Attorney, Agent, or Firm* — Xsensus LLP

(57) ABSTRACT

A device, a process execution system, a process execution method, and a non-transitory recording medium. The device requests an information processing system to perform a second process using result of a first process executed by the device, displays on a display, result of the second process acquired from the information processing system, and receives a request for the device to execute the first process again.

12 Claims, 19 Drawing Sheets

(56) References Cited

U.S. PATENT DOCUMENTS

| | | | |
|---|---|---|---|
| 2017/0155785 A1* | 6/2017 | Mizude | H04N 1/00734 |
| 2017/0155787 A1* | 6/2017 | Mizude | H04N 1/00708 |
| 2017/0155792 A1* | 6/2017 | Mizude | H04N 1/00748 |
| 2018/0205851 A1* | 7/2018 | Hattori | H04N 1/4413 |
| 2019/0124227 A1* | 4/2019 | Tabata | H04N 1/00785 |
| 2019/0124229 A1* | 4/2019 | Ishino | G06T 11/001 |
| 2019/0132471 A1* | 5/2019 | Fujita | H04N 1/00331 |
| 2019/0141213 A1* | 5/2019 | Mizude | H04N 1/3873 |
| 2019/0182389 A1* | 6/2019 | Ohwaku | H04N 1/0044 |
| 2019/0289158 A1* | 9/2019 | Inoue | G06F 9/4843 |
| 2019/0289159 A1 | 9/2019 | Kodama et al. | |
| 2019/0370539 A1* | 12/2019 | Shimamura | G06T 3/0056 |
| 2020/0028985 A1* | 1/2020 | Tagami | H04N 1/3878 |
| 2020/0145552 A1* | 5/2020 | Tagami | H04N 1/38 |
| 2020/0174637 A1* | 6/2020 | Tokita | G06F 3/0483 |
| 2020/0252517 A1* | 8/2020 | Mizude | H04N 1/3873 |
| 2020/0259971 A1* | 8/2020 | Miyamoto | H04N 1/00785 |
| 2020/0336613 A1* | 10/2020 | Shiraishi | G06F 40/174 |
| 2020/0344362 A1* | 10/2020 | Miyamoto | H04N 1/0044 |
| 2020/0382654 A1* | 12/2020 | Soga | H04N 1/393 |
| 2020/0382661 A1* | 12/2020 | Ito | H04N 1/00244 |
| 2020/0394247 A1 | 12/2020 | Inoue | |
| 2021/0203805 A1* | 7/2021 | Fuse | H04N 1/3871 |
| 2021/0227082 A1* | 7/2021 | Mori | H04N 1/00771 |
| 2021/0250461 A1* | 8/2021 | Takagi | H04N 1/00779 |

* cited by examiner

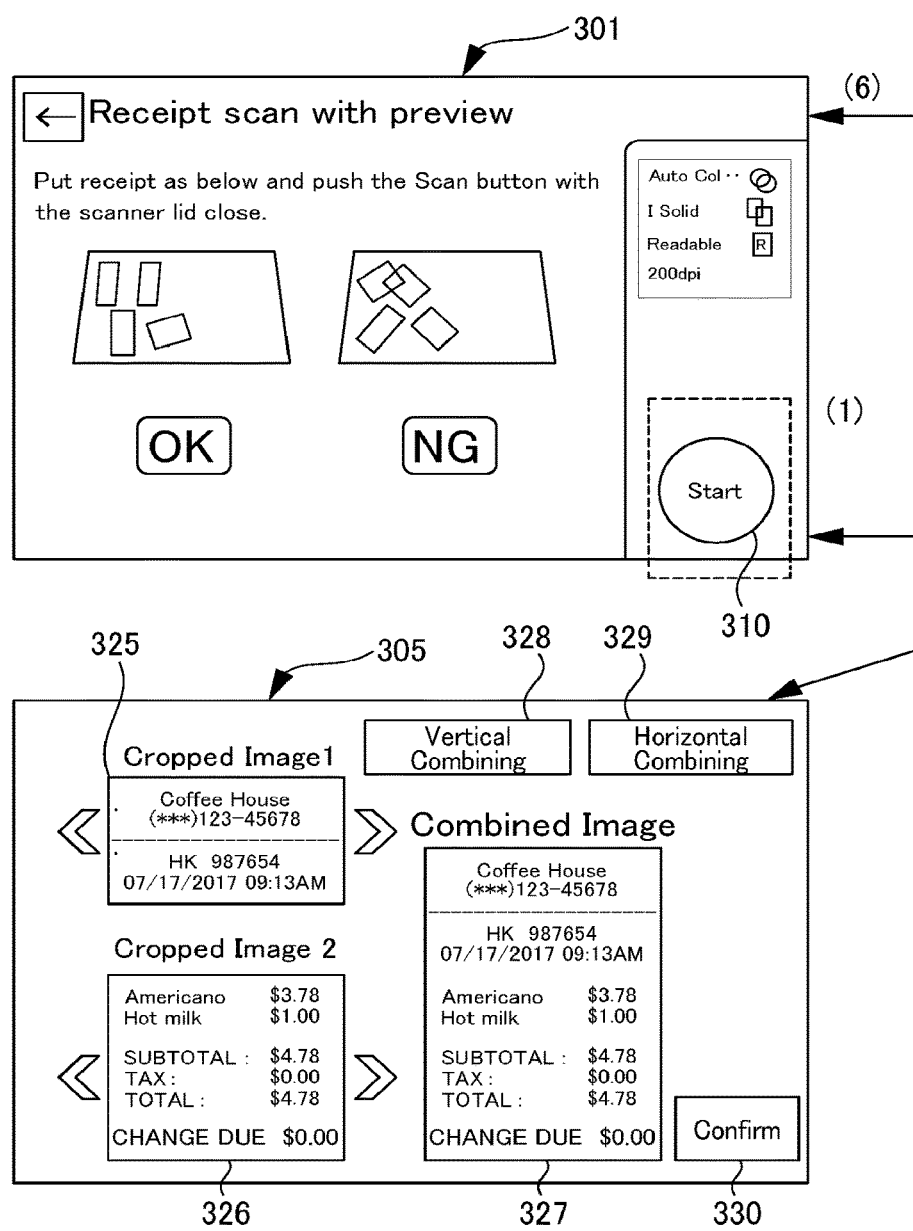

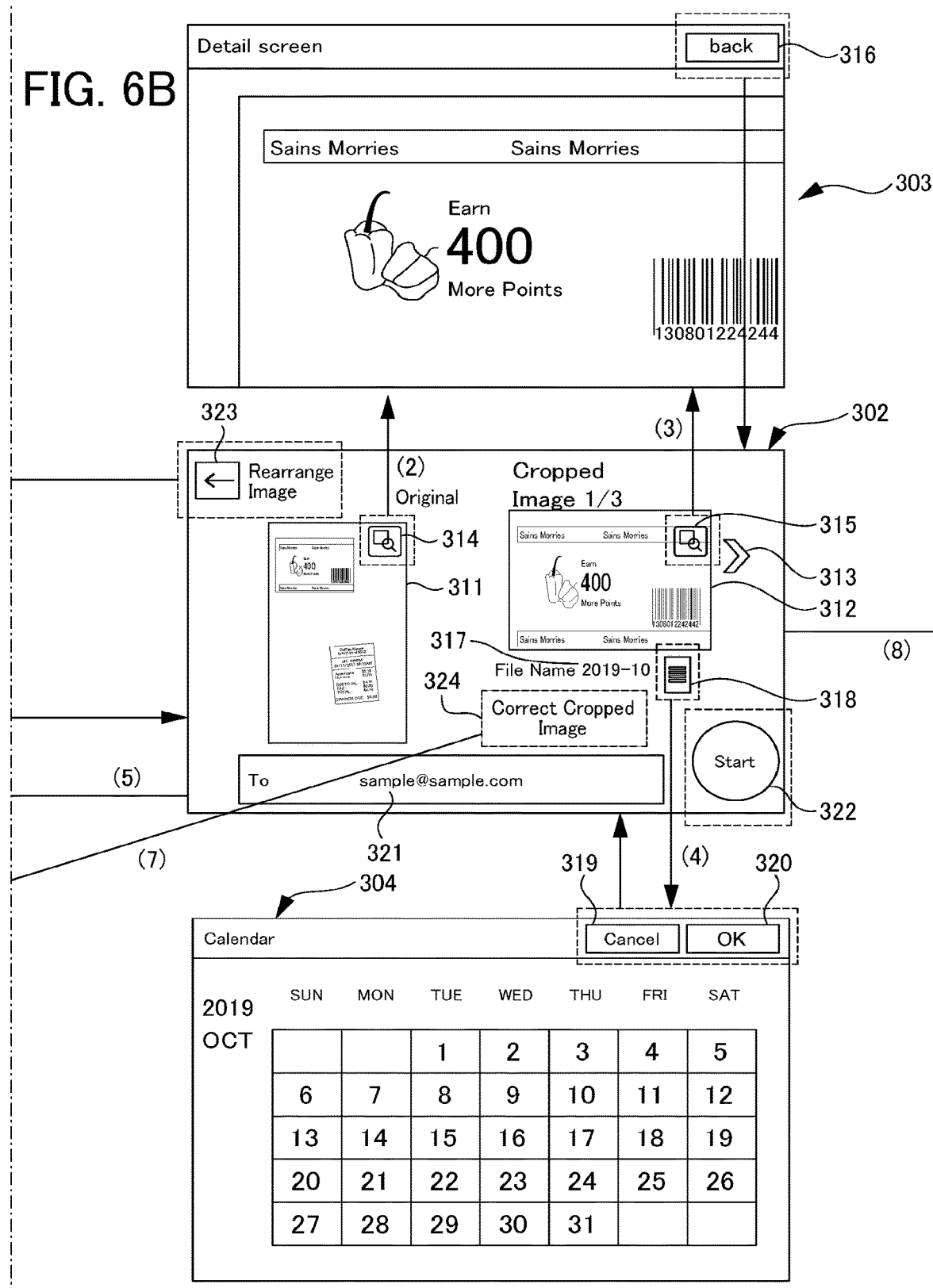

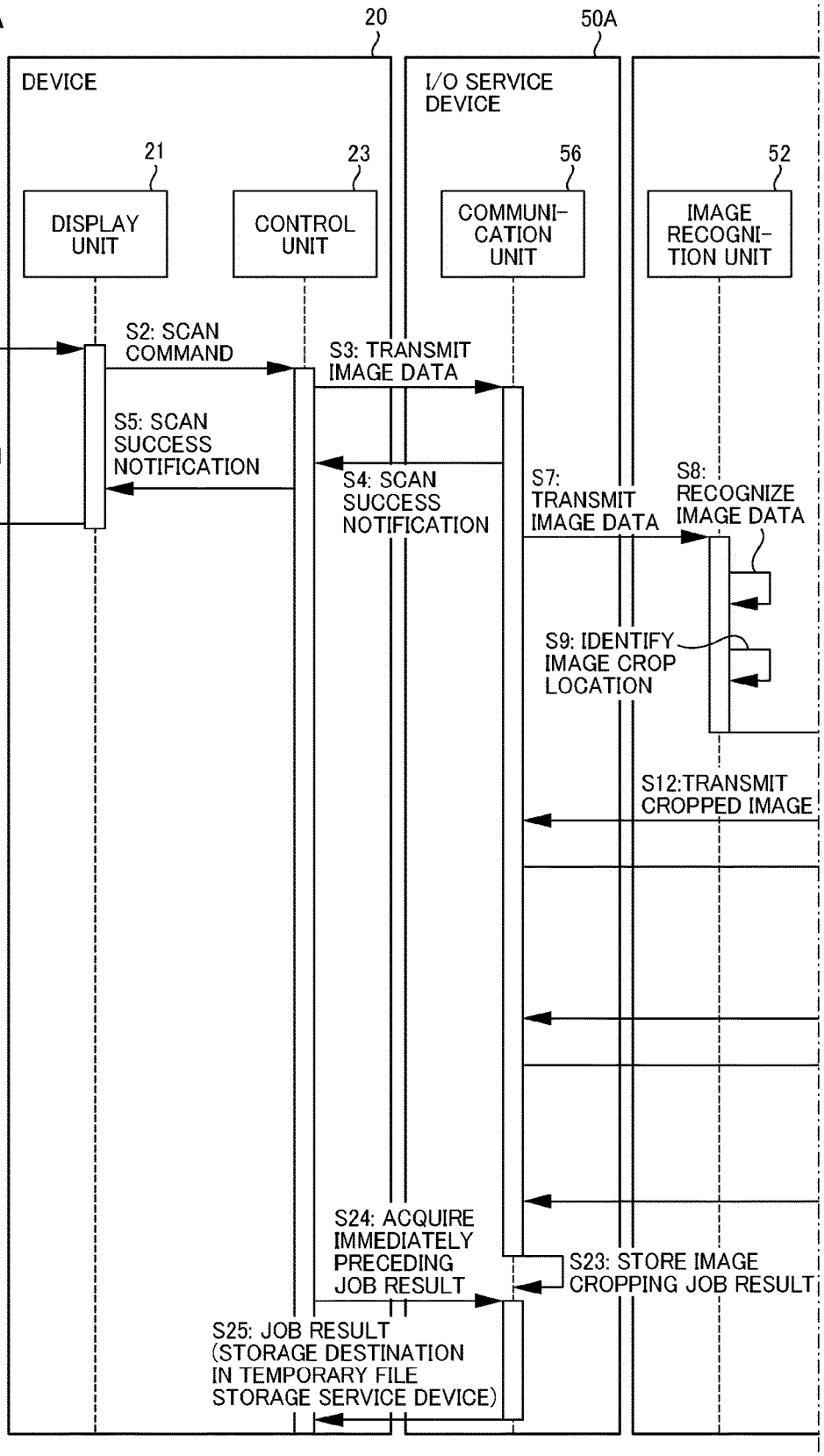

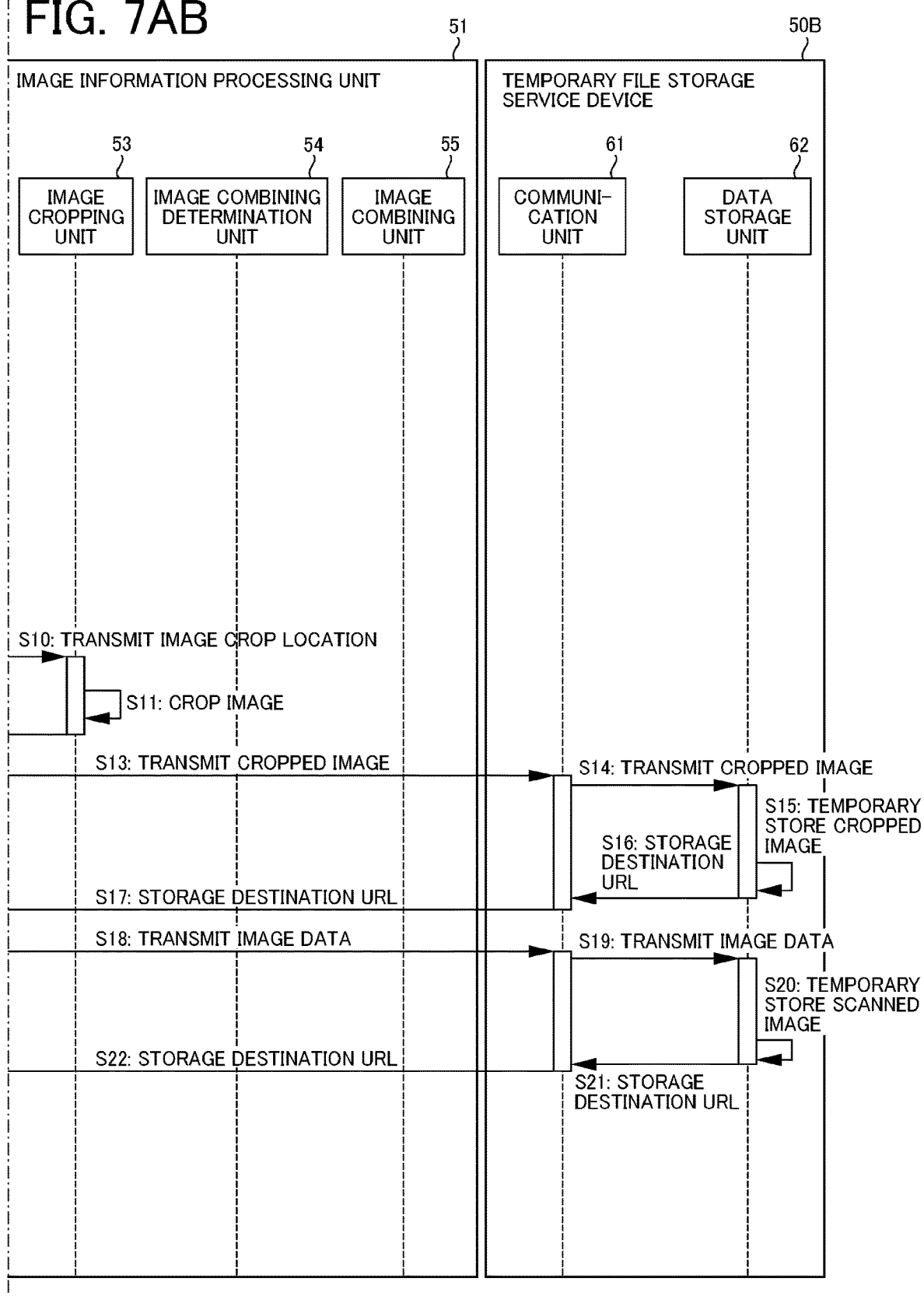

| FIG. 9AA |
|---|
| FIG. 9AB |

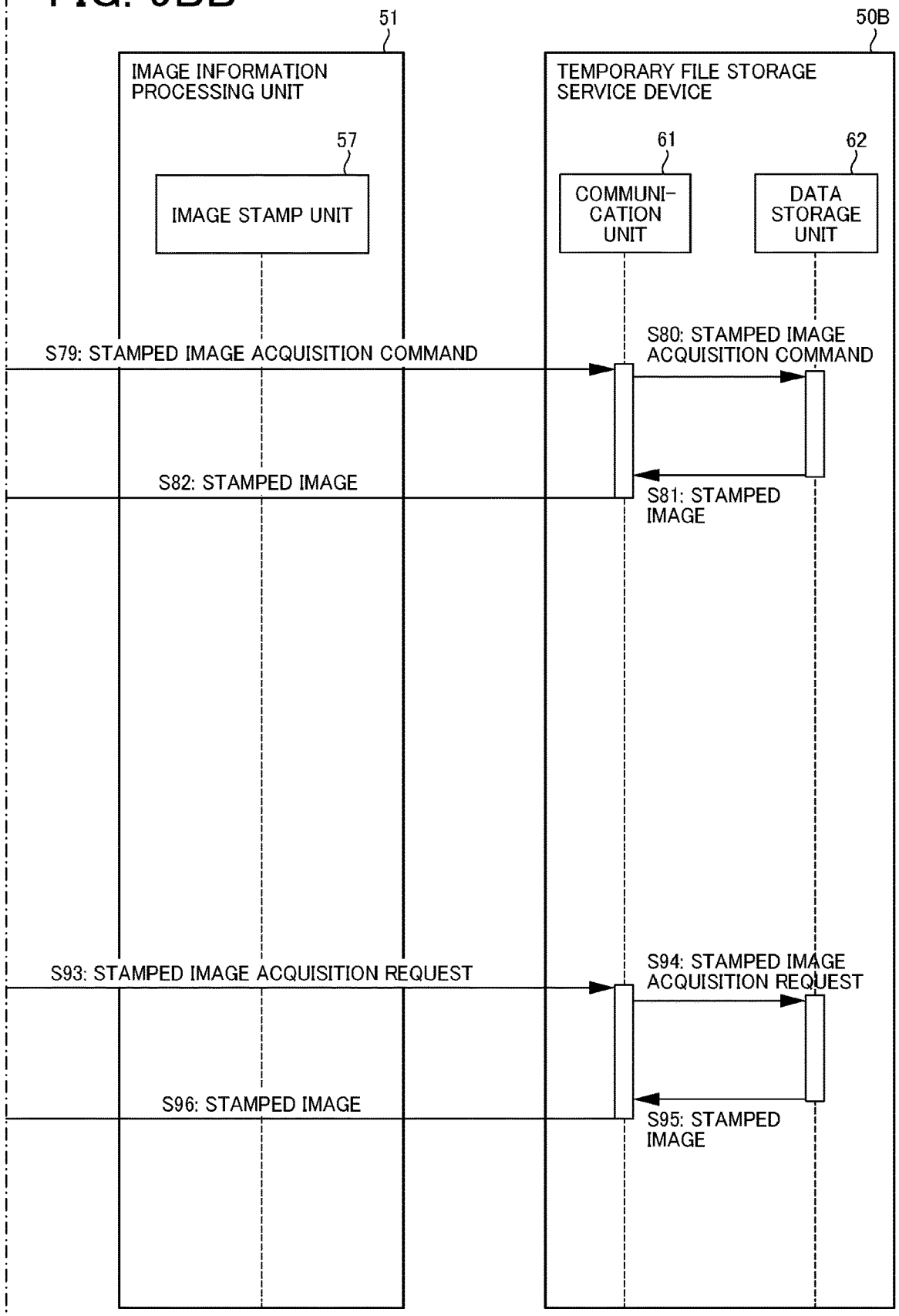

DEVICE, PROCESS EXECUTION SYSTEM, PROCESS EXECUTION METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-023801, filed on Feb. 14, 2020, in the Japan Patent Office, the entire disclosure of which is hereby incorporated by reference herein.

BACKGROUND

Technical Field

The present disclosure relates to a device, a process execution system, a process execution method, and a non-transitory recording medium.

Background Art

A web application that operates when a device such as a scanner communicates with an information processing system on a network is known. For example, when a device scans a plurality of receipts and transmits image data to the information processing system, the information processing system separates and stores the receipts.

A technique has been devised in which the information processing system not only stores individual receipt but also transmits the processing result of the receipts to the device. A system for transmitting an image scanned with an image forming apparatus to the outside to generate auxiliary data and send result of data processing to the image forming apparatus for a purpose of identifying a delimiter of each line of character strings in a scanned image is disclosed.

SUMMARY

The embodiments of the present disclosure describe a device, a process execution system, a process execution method, and a non-transitory recording medium. The device requests an information processing system to perform a second process using result of a first process executed by the device, displays on a display, result of the second process acquired from the information processing system, and receives a request for the device to execute the first process again.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 6A, 6B, and 6C are diagrams illustrating an example of a screen transition displayed on a control panel of a device;

FIGS. 7AA and 7AB are sequence diagrams illustrating a process from receipt scanning to receipt combining;

Figure 1:
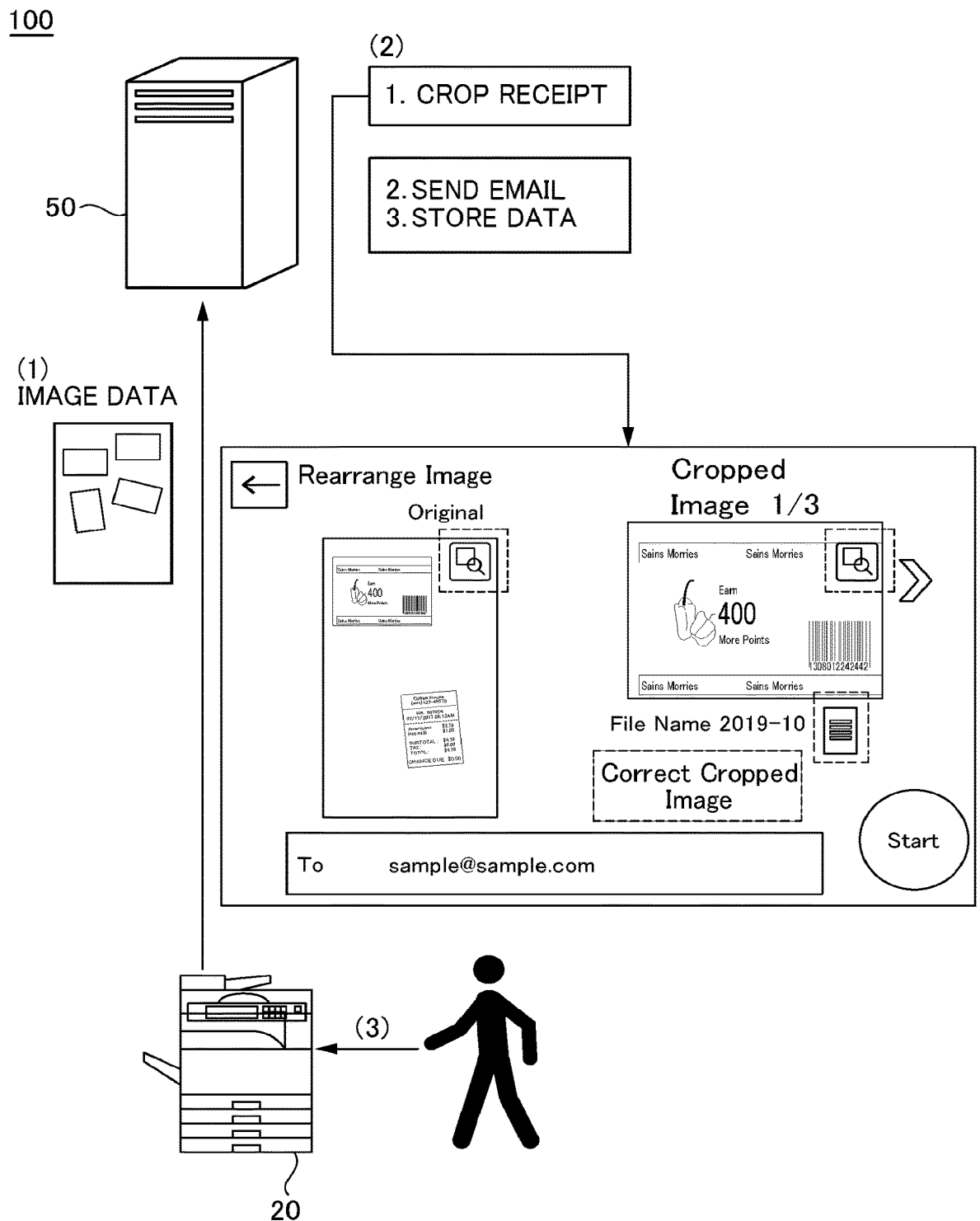
FIG. 1 is a diagram illustrating an outline of processing performed by a process execution system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, as an example of the embodiment for carrying out the present disclosure, a process execution system and a process execution method performed by a process execution system is described.

The outline of the process executed by the process execution system 100 of the present embodiment will be described with reference to FIG. 1. FIG. 1 is a diagram illustrating an outline of process performed by a process execution system 100 according to the present embodiment. In FIG. 1, a process in which an information processing system 50 crops (cuts out) each receipt from image data including a plurality of receipts and performs at least one of mail transmission or data storage is described as an example.

(1) A user scans a plurality of receipts with a device 20 such as a multi-function peripheral (MFP) (an example of a first process) and transmits image data to the information processing system 50.

(2) The information processing system 50
1. Crops the receipt,
2. Sends an email,
3. Stores data in order (examples of the second process).

Conventionally, processes 1 to 3 have been automatically executed without the intervention of a user. In the present embodiment, when the information processing system 50 "1. crops the receipt", the processing result is transmitted to the device 20.

(3) The device 20 displays the result of cropping the receipt and accepts whether or not to reprocess the result.

The reprocessing in this case is a scan. The user confirms that multiple receipts have been cropped properly, and if the user thinks that the receipts are not placed properly, the user rearranges the receipts. Then, the device 20 scans the plurality of receipts again and transmits the image data to the information processing system 50.

As described above, in a system that requests processing from the device 20 and executes a plurality of processing on the information processing system 50, when the information processing system 50, which may fail in processing due to the processing in the device, performs the processing, the information processing system 50 does not proceed to the subsequent process, and transmits the processing result to the device 20. The device 20 displays a screen for accepting input from the user whether to proceed to the processing of the subsequent process, or to re-execute the processing in the device 20, and re-executes the processing in the device 20 in response to an input from the user. Then, after the device 20 receives an instruction from the user to not execute the process again (execute the process in the subsequent process) via the screen, the information processing system 50 executes post-processing which are 2. send the email and 3. store the data.

As described above, a trouble of starting over the whole process again when a receipt is found not cropped after sending an email or saving data, can be reduced. The user can determine whether or not to perform the processing of the device 20 that causes the processing failure in the information processing system 50 again, since the processing result is displayed on the device 20 in the middle of a plurality of processes performed by the information processing system.

The second process using the result of the first process is, for example, recognition of receipts by the information processing system for the image data which is the result of scanning. However, the second process using the result of the first process is not limited to the present embodiment as long as there is a first process on the device side and a second process on the network.

Performing the first process again indicates performing the same process already performed by the device again. That is, the same process is executed twice or more.

Figure 2:
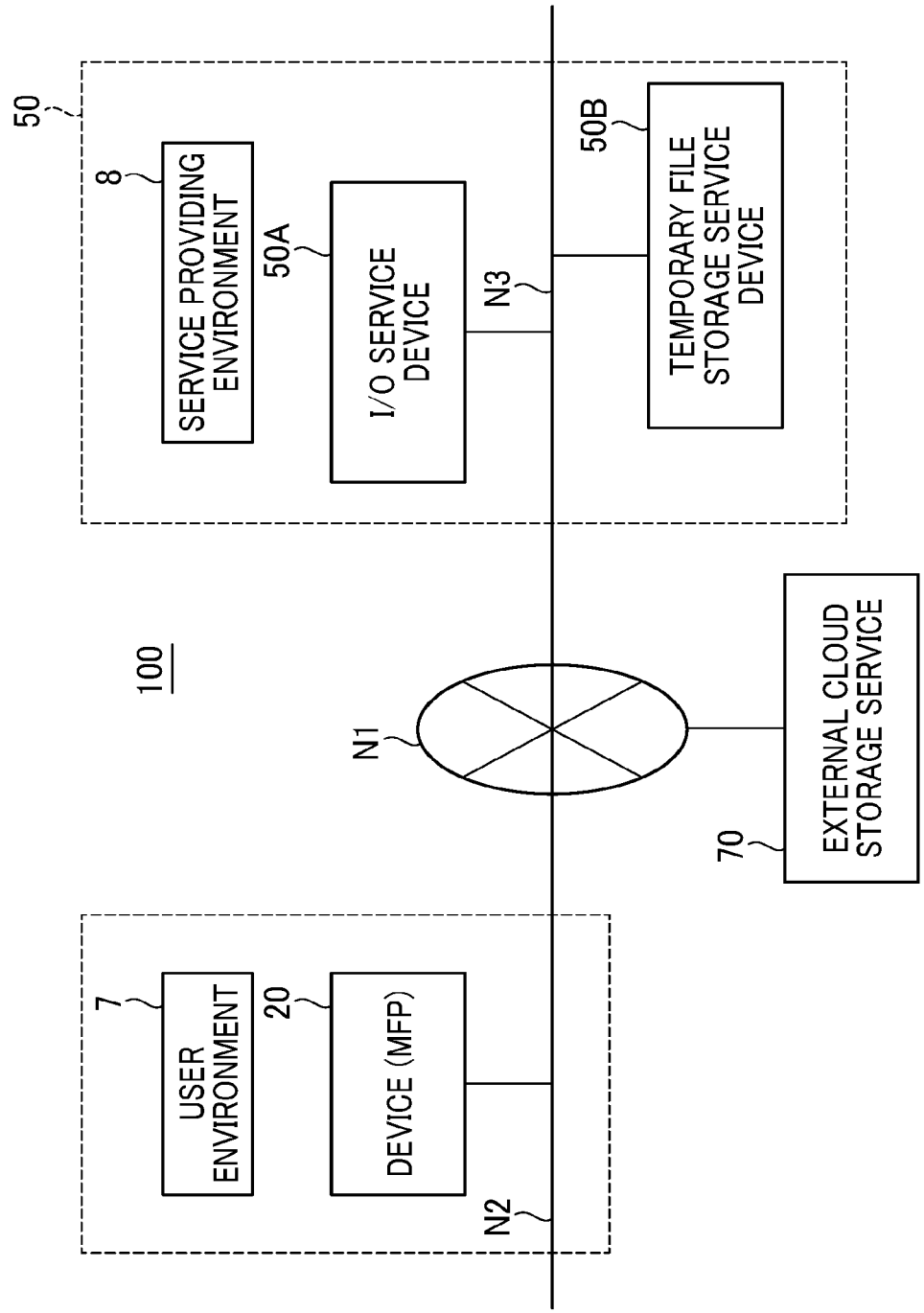
FIG. 2 is a block diagram illustrating a configuration of the process execution system.

FIG. 2 is a block diagram illustrating a configuration of the process execution system 100. In the process execution system 100 of FIG. 2, the user environment 7 and the service providing environment 8 are communicably connected via a wide area network N1 such as the internet. The network N1 may be a local area network (LAN) inside a firewall.

In the user environment 7, one or more devices 20 are connected to a network N2 such as the LAN. The device 20 is, for example, a device including a scanner function. The device 20 may be called an MFP, a laser printer, an image forming device, a multifunction device (multifunction printer), a scanner, a facsimile, or the like. Alternatively, the device 20 may be a device including a function of capturing an image of the receipt with a two-dimensional imaging element.

The device 20 is not limited to the scanner as long as the processing necessary for the processing performed by the information processing system 50 can be performed. As described below, the device 20 also includes a printing function. In addition, an output device such as a projector (PJ), and a digital signage, a head up display (HUD) device, an industrial machine, an imaging device, a sound collecting device, a medical device, a network home appliance, an automobile (connected car), a notebook computer, a mobile phone, a smartphone, a tablet terminal, a game console, a personal digital assistant (PDA), a digital camera, a wearable personal computer (PC) or a desktop PC may be included.

The device 20 of the present embodiment is a terminal for which the user uses the service provided by the information processing system 50. The user logs in to the information processing system 50 from the device 20, selects a web application (application software) for which the user has permission to use, and receives the service provided by the information processing system 50.

The service providing environment 8 is provided in a data center or the like, and an input and output (I/O) service device 50A and a temporary file storage service device 50B are connected to a network N3. The I/O service device 50A performs image processing of image data obtained by scanning with the device 20. The temporary file storage service device 50B is a device for temporarily storing the result of processing by the I/O service device 50A on the image data obtained by scanning.

The information processing system 50 provides a series of processes linked with an external service such as an external cloud storage service 70 as a service. A series of processes that are services provided by the information processing system 50 are referred to as, for example, a "process flow" or a "workflow".

Further, in the present embodiment, a cloud system is described as a specific example of the information processing system 50, but the present embodiment is not limited to the cloud system. Cloud system refers to a system in which resources on a network are used without being conscious of specific hardware resources. The information processing system 50 may reside on the internet or on-premises network.

Both the I/O service device 50A and the temporary file storage service device 50B are implemented by one or more information processing apparatuses. Although the I/O service device 50A and the temporary file storage service device 50B are illustrated as a separate device in the figure, the two devices may be the same device.

The external cloud storage service 70 is a storage device that stores scanned image data. Alternatively, the external cloud storage service is a storage device that stores a file for printing by the device 20. A known service may be used as the external cloud storage service 70. For example, GOOGLE DRIVE (registered trademark), OFFICE365 (registered trademark), ONE DRIVE (registered trademark), etc. may be used.

However, the external cloud storage service 70 is not always necessary. In addition, a wide variety of servers such as a mail server may be used depending on the web application executed by the user.

Figure 3:
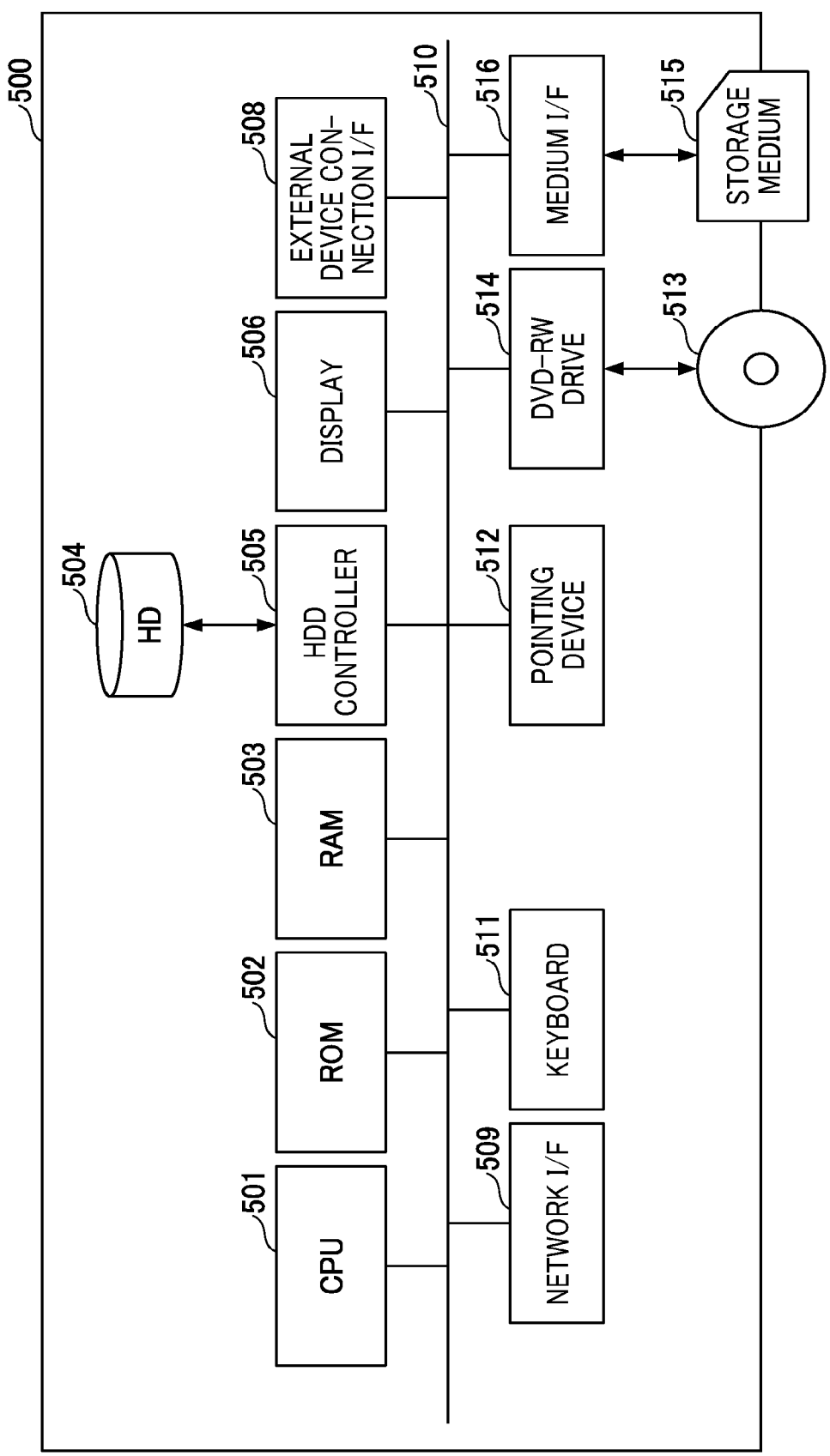
FIG. 3 is a block diagram illustrating a hardware configuration of an example of a computer.

The information processing system 50 or the external cloud storage service 70 of FIG. 2 is implemented by, for example, a computer having a hardware configuration illustrated in FIG. 3. FIG. 3 is a block diagram illustrating an example of a hardware configuration of the computer. The computer 500 of FIG. 3 is implemented by the computer as illustrated in FIG. 3 including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514 and a medium I/F 516.

Among these elements, the CPU 501 controls entire operation of the computer. The ROM 502 stores a program such as an initial program loader (IPL) used for driving the CPU 501. The RAM 503 is used as a work area for the CPU 501. The HD 504 stores various data such as a control program. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface that controls data communication performed with an external device through the communication network. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to the storage medium 515 such as a flash memory.

Figure 4:
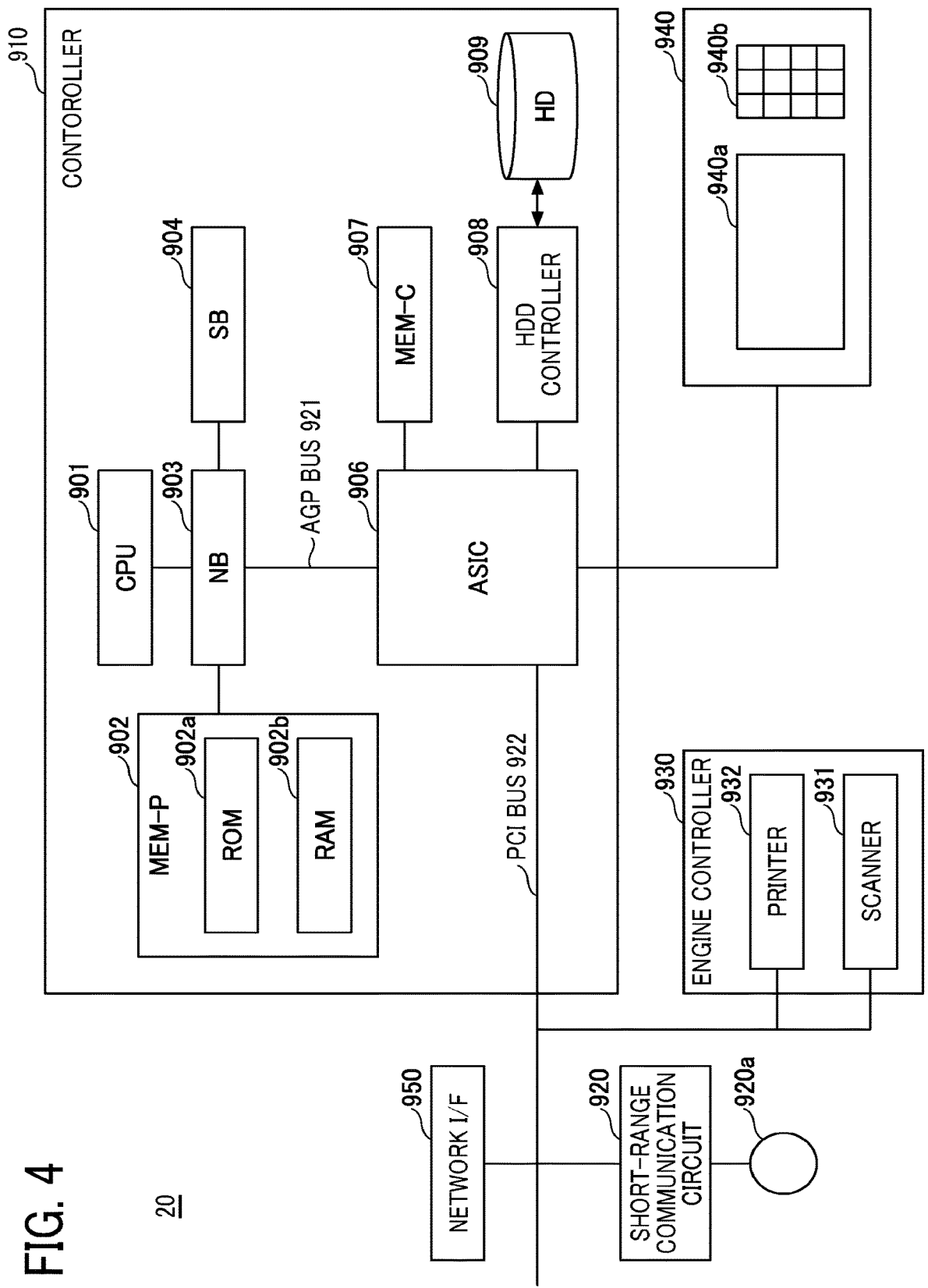
FIG. 4 is a block diagram illustrating a hardware configuration of an example of a device.

FIG. 4 is a block diagram illustrating a hardware configuration of an example of the device 20. FIG. 4 describes the hardware configuration of the MFP as the device 20. As illustrated in FIG. 4, the device 20 includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the device 20. The NB 903 connects the CPU 901 with the MEM-P 902, SB 904, and AGP bus 921 and includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910 and further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a peripheral component interconnect (PCI) device or a peripheral device. The ASIC 906 is an integrated circuit (1C) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a universal serial bus (USB) interface, or the institute of electrical and electronics engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with the near field communication (NFC), the BLUETOOTH (registered trademark) and the like.

The engine controller 930 includes a scanner 931 and a printer 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls all operations of the device 20, for example, drawing, communication, or user input to the control panel 940. The scanner 931 or the printer 932 includes an image processing unit such as error diffusion processing and gamma conversion processing.

In response to an instruction to select a specific application through the control panel 940, for example, using a mode switch key, the device 20 selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile mode is selected.

The network I/F 950 controls communication of data with an external device through the communication network. The short-range communication circuit 920 and the network I/F 950 are electrically connected to the ASIC 906 through the PCI bus 922.

Figure 5:
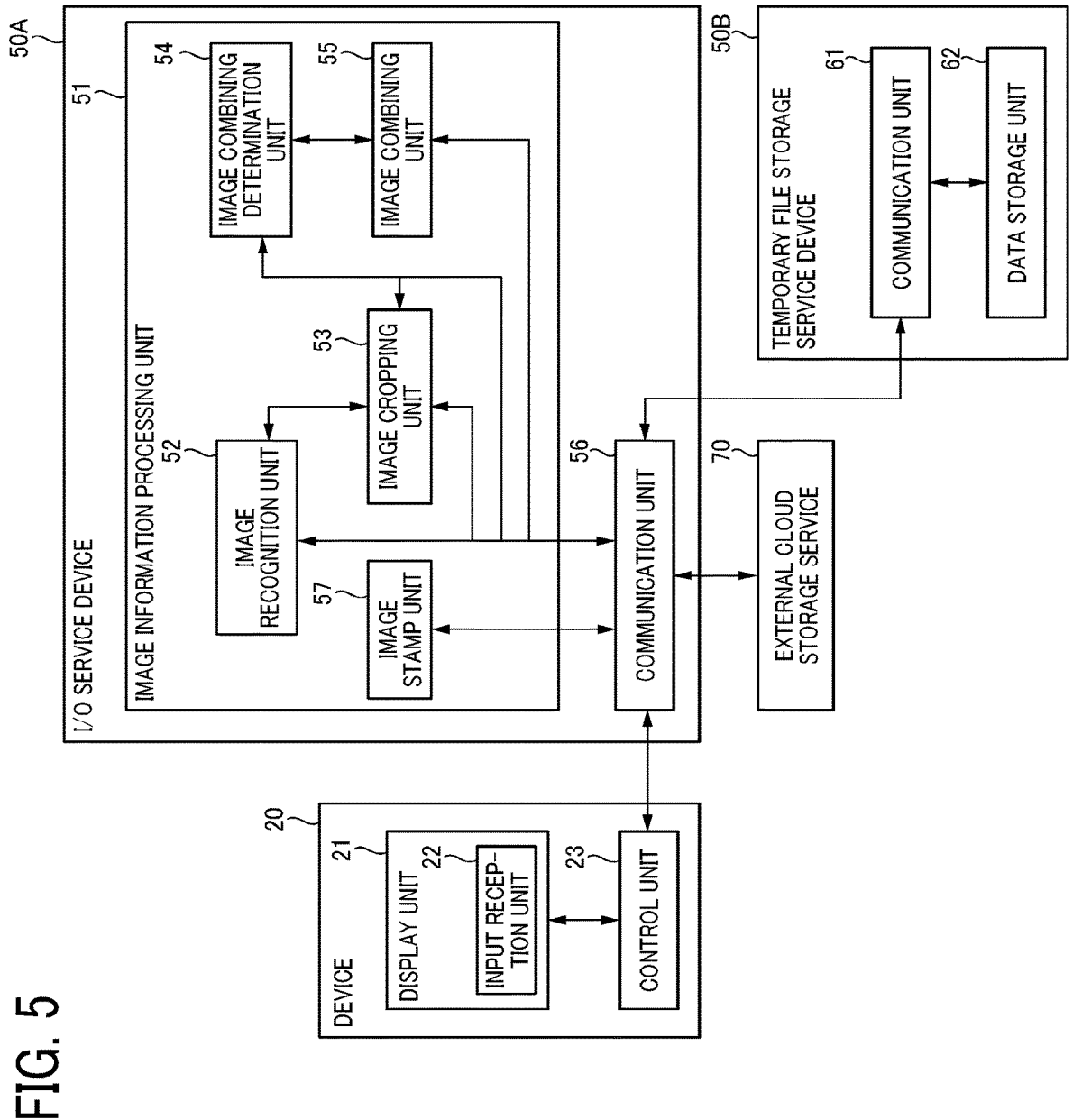
FIG. 5 is a block diagram illustrating a functional configuration of an example of a process execution system.

A functional configuration of the process execution system 100 according to the present embodiment is described with reference to FIG. 5. FIG. 5 is a block diagram illustrating a functional configuration of an example of a process execution system 100.

The device 20 includes a display unit 21 and a control unit 23. Each of these functional units is implemented by the CPU 901 executing an instruction included in one or more programs (for example, a web browser and JAVASCRIPT (registered trademark)) installed in the device 20.

The display unit 21 displays a screen operated by the user. The screen information of this screen may be transmitted from the information processing system 50 to the device 20 or may be stored in the device 20. When the application executed by the user on the device 20 is a web application, the screen information is transmitted from the information processing system 50, and when the application executed by the user on the device 20 is a native application, the screen information transmitted from the information processing system 50 is arranged on the screen information stored in the device 20.

The screen information transmitted from the information processing system 50 is generated by Hyper Text Markup Language (HTML), Extended Markup Language (XML), Cascade Style Sheet (CSS), and JAVASCRIPT (registered trademark), for example. Although there is no strict definition of a web application, the web application refers to software executed on a web browser. The web application is implemented by a cooperation between a program written in a programming language such as JAVASCRIPT (registered trademark) that operates on the web browser and a program provided by a web server. Further, the web application refers to a mechanism that implements such software. The web page can be dynamically changed by the web application. In this case, the display unit 21 is implemented by the web browser. In this embodiment, the web application may be simply referred to as an application.

The display unit 21 includes an input reception unit 22. The input reception unit 22 receives an operation from the user via a touch panel, hard keys, or the like. The input information is transmitted to the control unit 23.

The control unit 23 performs screen transitions of the device 20, communication with the information processing system 50, execution of processing (scanning, etc.) possessed by the device 20, and the like. For example, according to the information transmitted from the input reception unit 22, the processing is executed by own machine, or the I/O service device 50A communicates with the I/O service device 50A to perform some processing. In addition, the data received from the information processing system 50 is transmitted to the display unit 21 to change the screen.

The I/O service device 50A includes an image information processing unit 51 and a communication unit 56. The image information processing unit 51 further includes an image recognition unit 52, an image cropping unit 53, an image combining determination unit 54, an image combining unit 55, and an image stamp unit 57. Each of these functional units is implemented by the CPU 501 executing an instruction included in one or more programs installed in the I/O service device 50A.

The image recognition unit 52 recognizes an area (individual receipt) to be cropped from the image data transmitted from the device 20. The image recognition unit 52, for example, binarizes the image data and recognizes the outline of the cropped area. By recognition, for example, the coordinates of the four vertices of the receipt are determined.

The image cropping unit 53 executes an image cropping process (a process of cutting out each receipt from the image data) based on the result of the image recognition unit 52.

As a result of image cropping, the image combining determination unit 54 identifies a cropped image that should normally be combined, such as one receipt divided into two or more receipts. For example, the X and Y coordinates of the cropped area and the vertical and horizontal sizes of the cropped area are used. When the difference between the horizontal sizes of receipt A and receipt B is less than a certain amount, and the difference between the Y coordinate of the lower left vertex of the cropped image of receipt A and the Y coordinate of the upper left vertex of the cropped image of receipt B is less than a certain amount, detected result is that the original receipt may be restored by vertically joining the two receipts. The image combining determination unit 54 feeds back the image combining determination result to the user so that the user can confirm the determination result of the image combining determination unit 54. The image combining unit 55 combines a plurality of cropped images (receipts) into one according to the confirmation result from the user.

The image stamp unit 57 superimposes an image of a stamp on the image when the portable document format (PDF) file or the like is printed to generate a stamped image. That is, a preview image with a stamp is generated.

The communication unit 56 transmits and receives various information to and from the device 20, the external cloud storage service 70, and the temporary file storage service device 50B.

The temporary file storage service device 50B includes a communication unit 61 and a data storage unit 62. Each of these functional units is implemented by the CPU 501 executing an instruction included in one or more programs installed in the temporary file storage service device 50B.

The communication unit 61 transmits and receives image data and cropped images to and from the I/O service device 50A. The data storage unit 62 manages the image data and the cropped image by a uniform resource locator (URL) and temporarily stores the image data. Temporarily indicates until the data is saved in the external cloud storage service 70 or until the data is sent by email. (After the information processing system 50 finishes the image processing, and while the user confirms whether the reprocessing is necessary in the device 20).

Figure 6C:
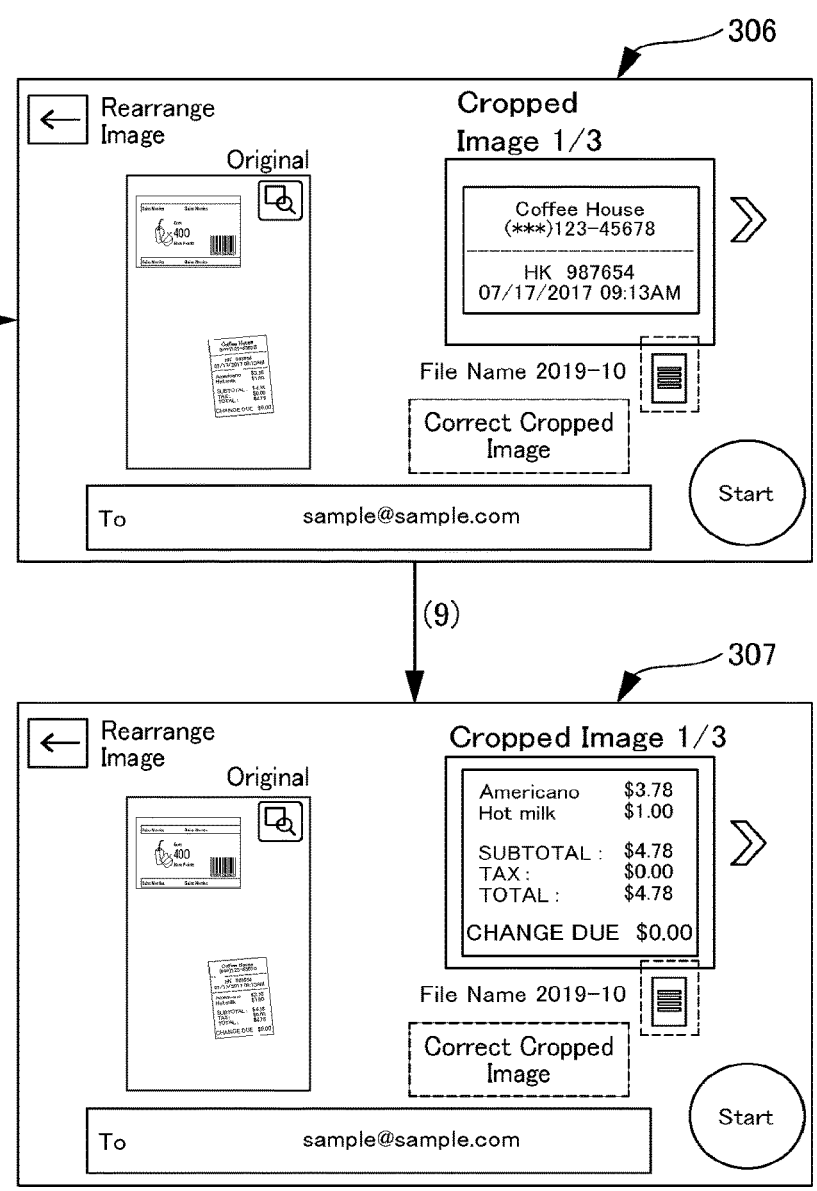

The screen transition and the processing is described with reference to FIGS. 6A, 6B, and 6C. FIGS. 6A, 6B, and 6C are diagrams illustrating an example of a screen transition displayed on the control panel 940 of the device 20. In the application executed in FIGS. 6A, 6B, and 6C, the I/O service device 50A crops a receipt from the image data obtained by scanning with the device 20, sets a file name for each receipt, and transmits to a designated email address. In FIGS. 6A, 6B, and 6C, serial numbers (1) to (9) are assigned to the main operations performed by the user. Each operation is described below.

(1) On a screen 301, the user places one or more receipts on an exposure glass and executes a scan. For example, a start button 310 is pressed. The scan is performed with a pressure plate closed, because the receipt may be curled, and it is preferable to stretch the receipt with the pressure plate. On the other hand, when the pressure plate is closed, space between the receipts is read by color of the pressure plate. Therefore, when the color of the pressure plate and the color of the receipt are the same, it becomes difficult for the image recognition unit 52 to identify the coordinates of the receipt. The device 20 may scan with the pressure plate open.

The device 20 transmits the image data obtained by scanning to the I/O service device 50A. The I/O service device 50A crops the receipt. The cropped result is stored in the temporary file storage service device SOB. The device 20 downloads the cropped image (image of each receipt) from the temporary file storage service device 50B. As a result, the screen transitions to a screen 302. An original 311 (image before cropping) obtained by scanning and a cropped image 312 (each cropped image) are displayed on the screen 302. The user can switch the cropped image with a button 313.

(2) The user can press an icon 314 on the upper right of the original 311 to enlarge the original 311.

(3) The user can press an icon 315 on the upper right of the cropped image 312 to enlarge the cropped image 312. A screen 303 is an enlarged cropped image 312. The original 311 is also enlarged and displayed when the icon 314 is pressed. When a back button 316 on the screen 303 is pressed, the screen returns to the screen 302.

(4) In each cropped image 312, a date 317 assigned by the I/O service device 50A is displayed as a file name. In this application, the user can designate the date 317 as the image file name. A calendar icon 318 is displayed to designate the date as the image file name. When the user presses the calendar icon 318, a screen 304 is displayed. The screen 304 is a calendar, and the user can select a date as the file name. When a cancel button 319 or an OK button 320 on the screen 304 is pressed, the screen 304 returns to the screen 302.

(5) Since this application transmits the cropped image 312 by email in a subsequent process, the screen 302 includes a destination email address 321 and a start button 322. It is assumed that the email address 321 is set in this application. However, the user may display an address book on the control panel 940 and set another email address. If the cropped image 312 correctly crops the receipt, the user presses the start button 322. After transmission, the screen 302 returns to the screen 301. The email may be sent by directly sending the cropped image 312 from the device 20 to the mail server. Alternatively, the device 20 may transmit a request for starting the subsequent process to the I/O service device 50A and in response to the request, the I/O service device 50A may acquire a file from the temporary file storage service device 50B and send the email.

Further, the form of transmitting the cropped image 312 by email in the subsequent process is an example, and the cropped image 312 may be transmitted to an external system such as an expense settlement system without sending the email. In this case, after the device 20 transmits a request for starting the subsequent process to the I/O service device 50A, the I/O service device 50A may acquire a file from the temporary file storage service device 50B and transmit the file to the expense settlement system not included in the service providing environment.

(6) If result of image cropping is not as expected, the user presses a rearrange image button 323. As a result, the screen 302 returns to the screen 301. If the receipts are tilted significantly, remain curled, or the distance between the receipts is too close, the cropping may not be successful. The user presses the start button 310 again, for example, after rearranging the receipts.

As described above, the information processing system 50 accepts an input of a reprocessing on the device from the user before transmitting the email.

(7) It may not be possible to solve the problem simply by rearranging the receipts. Therefore, the screen 302 includes a correct cropped image button 324. For example, when one receipt is output as a plurality of cropped images, the user presses the correct cropped image button 324. In response, a screen 305 is displayed. The screen 305 includes two cropped image fields 325, 326, a vertical combining button 328, a horizontal combining button 329, a combined image field 327, and a confirm button 330. The two cropped image fields 325 and 326 displays all the cropped images, respectively. The user displays the cropped images, which were originally one receipt, in the two cropped image fields 325 and 326. When there are three cropped receipts, the user can select the correct combination that was originally one receipt from the 3×3 combination. The vertical combining button 328, and the horizontal combining button 329 are buttons for the user to designate direction of combining the two cropped images. The combined result by the I/O service device 50A is displayed in the combined image field 327. The confirm button 330 is a button for confirming the combined result. As a result, the screen 305 returns to the screen 302, but the combined image is displayed in the cropped image 312.

In addition, although two cropped images are candidates for combining on the screen 305, three or more cropped images may be candidates for combining.

(8) When the user presses a button 313 on the screen 302, the cropped image is switched and a screen 306 is displayed. On the screen 306, the same transition as on the screen 302 is possible.

(9) When the user presses the button 313 on the screen 306, the cropped image is switched and the screen 307 is displayed. On the screen 307, the same transition as the screen 302 is possible.

With reference to FIGS. 7AA, 7AB, 7BA, 7BB, 7CA, and 7CB, a process of cropping the image by the process execution system 100 and accepting from the user whether or not to scan the image again with the device 20 is described. FIGS. 7AA, 7AB, 7BA, 7BB, 7CA, and 7CB are sequence diagrams illustrating a process from scanning receipts to combining receipts.

First, an outline is described. In the process execution system 100, processing on the cloud by the I/O service device 50A is executed asynchronously with the device 20. Therefore, when the user scans and transmits the image to the I/O service device 50A, the I/O service device 50A returns a scan success notification to the device 20 when the image data is received. The device 20 displays on the control panel that a scan job was successful.

Actually, the I/O service device 50A executes the image cropping, stores the image data and the cropped image in the temporary file storage service device 50B, and the like. With the temporary file storage service device 50B, the device 20 can acquire the image data and the cropped image even if the I/O service device 50A performs processing asynchronously.

The device 20 acquires image data and a cropped image from the temporary file storage service device 50B by using the URL of the image stored in the temporary file storage service device 50B included in the execution result of the application. The device 20 displays the image and the cropped image on the control panel 940.

In step S1, the user arranges the receipt on the device 20 and starts the scan by pressing the start button 310 on the screen 301 displayed on the control panel 940. The input reception unit 22 receives the execution of the scan.

In step S2, the display unit 21 transmits the "scan" processing execution command received by the input reception unit 22 to the control unit 23 that communicates with other devices.

In step S3, the control unit 23 executes scan process to generate image data and transmits the image data to the I/O service device 50A.

In step S4, as described above, since the I/O service device 50A executes image processing asynchronously, when the image data is received, the communication unit 56 of the I/O service device 50A send a scan success notification to the control unit 23 of the device 20.

In step S5, the control unit 23 transmits the received success notification to the display unit 21.

In step S6, the display unit 21 displays the scan success notification screen on the control panel 940 in order to feed back the scan success to the user.

From step S7 to step S27, image processing is performed by the I/O service device 50A asynchronously with the device 20. The communication unit 56 transmits the image data to the image recognition unit 52 of the image information processing unit 51.

In step S8, the image recognition unit 52 analyzes the image data (binarization, etc.) in order to identify the cropping location.

In step S9, the image recognition unit 52 identifies the image cropping location (coordinates of the four vertices of each receipt) based on the analysis result.

In step S10, the image recognition unit 52 transmits the cropping location to the image cropping unit 53 that performs the image cropping process.

In step S11, the image cropping unit 53 executes the cropping process based on the received image cropping location.

In step S12, the image cropping unit 53 transmits a cropped image group to the communication unit 56.

In step S13, the communication unit 56 transmits the cropped image group to the temporary file storage service device 50B in order to store the cropped image group in the temporary file storage service device 50B.

In step S14, the communication unit 61 of the temporary file storage service device 50B receives the cropped image group and transmits the cropped image group to the data storage unit 62.

In step S15, the data storage unit 62 stores the cropped image group.

In step S16, the data storage unit 62 returns the storage destination URL information in which the cropped image group is stored to the communication unit 61.

In step S17, the communication unit 61 of the temporary file storage service device 50B transmits the storage destination URL information to the I/O service device 50A.

In step S18, the communication unit 56 of the I/O service device 50A transmits the image data to the temporary file storage service device 50B in order to save the original image data in the temporary file storage service device 50B.

In step S19, the communication unit 61 of the temporary file storage service device 50B receives the image data and transmits the image data to the data storage unit 62.

In step S20, the data storage unit 62 stores the image data.

In step S21, the data storage unit 62 returns the storage destination URL information, which is the storage destination of the image data, to the communication unit 61.

In step S22, the communication unit 61 of the temporary file storage service device 50B transmits the storage destination URL information to the I/O service device 50A.

In step S23, the communication unit 56 of the I/O service device 50A stores the storage destination URL information as the cropping job execution result.

In step S24, in order to acquire the result of image processing executed asynchronously, the control unit 23 of the device 20 inquires the I/O service device 50A of an immediately preceding job execution result. For example, after step S4, the control unit 23 repeatedly polls the I/O service device 50A to inquire about the end of image processing, which is unknown when the processing will end. Alternatively, the I/O service device 50A may transmit the end of image processing to the device 20 by push notification.

In step S25, the control unit 23 of the device 20 acquires the job execution result including the storage destination URL information from the I/O service device 50A.

Figure 7B:
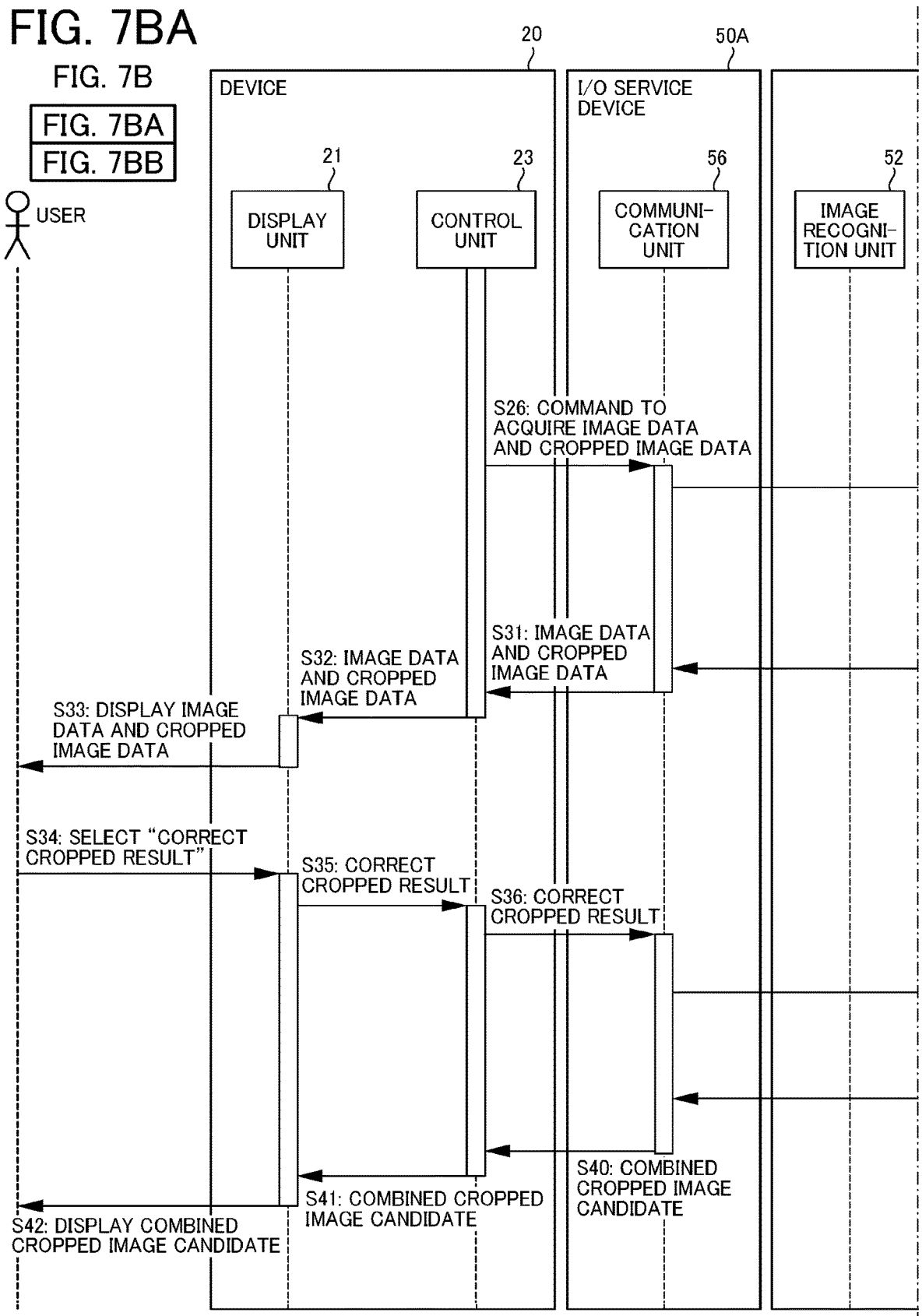
FIGS. 7BA and 7BB are sequence diagrams illustrating the process from receipt scanning to receipt combining.
Figure 7B:
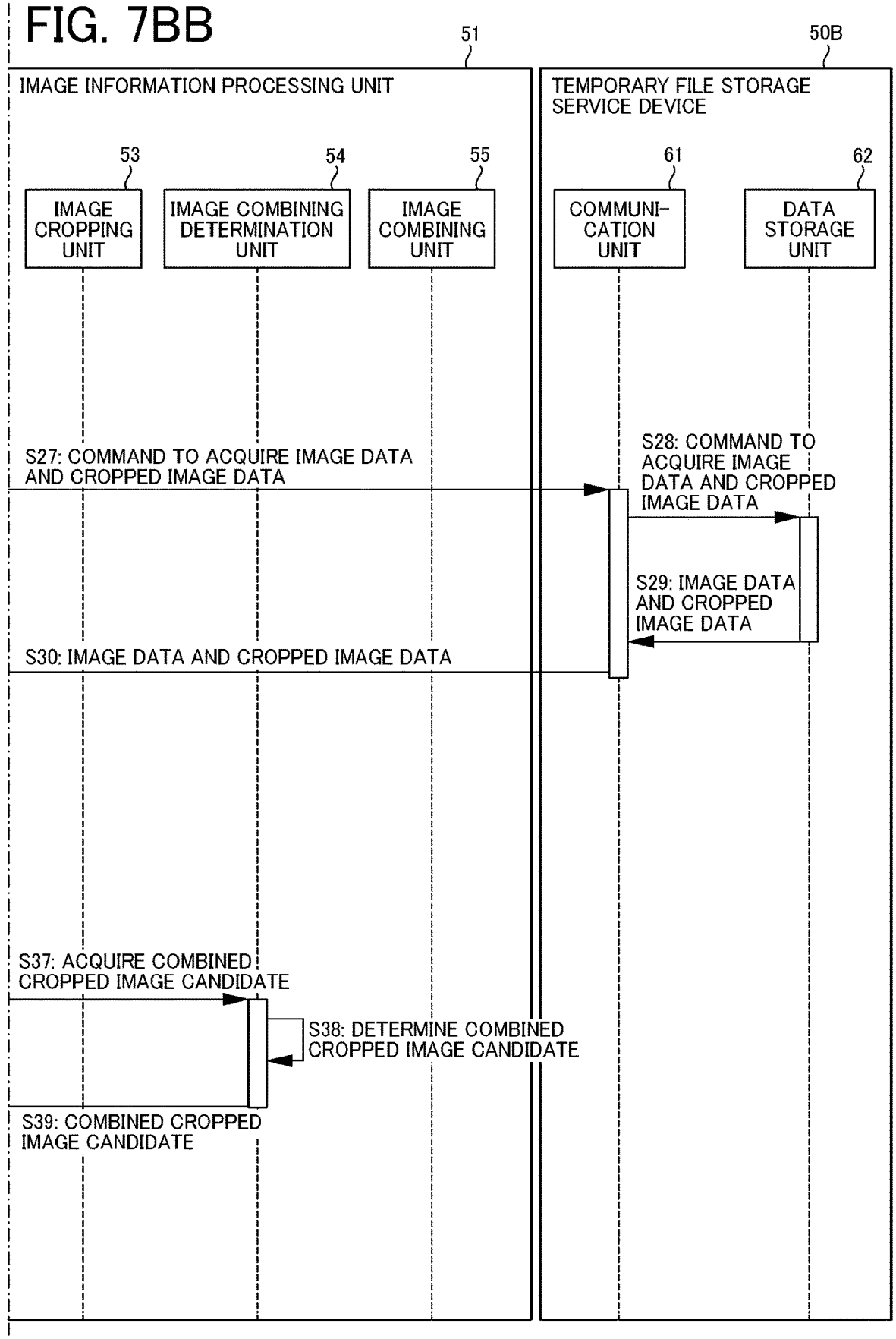
Figure 7C:
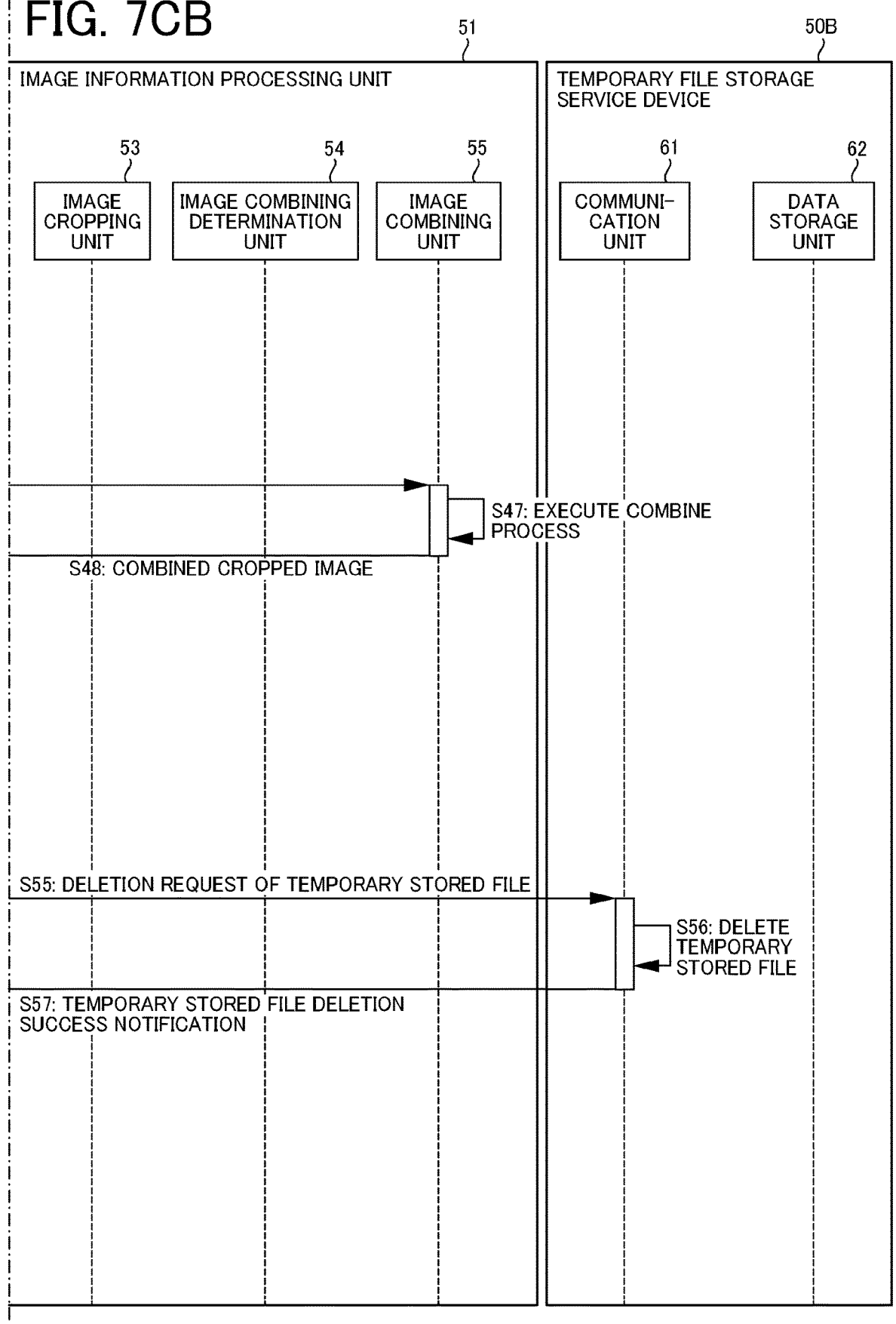
FIGS. 7CA and 7CB are sequence diagrams illustrating the process from receipt scanning to receipt combining.

In steps S26 to S28, the control unit 23 acquires the image data and the cropped image using the storage destination URL information. In FIGS. 7BA and 7BB, the I/O service device 50A is used, but the device 20 may directly communicate with the temporary file storage service device 50B.

In steps S29 to S32, the data storage unit 62 of the temporary file storage service device 50B transmits the image data and the cropped image identified by the storage destination URL information to the device 20.

In step S33, the display unit 21 displays the image data and the cropped image on the control panel 940. In response, the screen 302 of FIG. 6B is displayed.

In step S34, when the cropped result cannot be corrected by rearranging the receipt or the like, the user presses a correct cropped image button 324 on the screen 302. The input reception unit 22 receives the pressing of the button.

In steps S35 to S37, the device 20 transmits a combined cropped image candidate acquisition command to the I/O service device 50A.

In step S38, the image combining determination unit 54 feeds back to the user an image having a high estimated value to be combined from the cropped images as a default candidate. For example, in two cropped images with almost the same horizontal size, if the difference between the Y coordinate of the lower left vertex of one cropped image and the Y coordinate of the upper left vertex of the other cropped image is less than a certain value, it is likely that the two cropped images should be combined. The image combining determination unit 54 combines two cropped images that are likely to be combined and gives the cropped images the same priority.

In steps S39 to S41, the I/O service device 50A transmits the combined cropped image candidates to the device 20.

In step S42, the display unit 21 of the device 20 displays the combined cropped image candidates on the control panel 940 in the order of priority. As a result, the screen 305 is displayed. Since all the cropped images can be displayed in the two cropped image fields 325 and 326 of the screen 305, steps S35 to S41 may not be necessary. However, by the processing of steps S35 to S41, the device 20 can display the cropped image having a high possibility of being combined in the cropped image fields 325 and 326 with priority or by default.

In step S43, the user selects two cropped images to be combined and inputs the combining direction. The input reception unit 22 receives the selection and the input.

In steps S44 to S46, the device 20 designates two cropped images and a combining direction and transmits a combining request to the I/O service device 50A.

In step S47, the image combining unit 55 combines two designated cropped images.

In steps S48 to S50, the I/O service device 50A transmits the combined cropped image to the device 20.

In step S51, the display unit 21 of the device 20 displays the image data and the cropped image on the control panel 940. As a result, the screen 302 is displayed again. If the number of cropped images before combining is three, the number of cropped images will be two after combining.

In step S52, when the user determines that the scanning should be done again using the device 20, the user presses the rearrange image button 323 on the screen 302. As a result, the screen 302 returns to the screen 301, and the user rearranges the receipt and presses the start button 310. The input reception unit 22 receives the pressing of the button.

In step S53, the display unit 21 transmits the rearrange of the image processing to the control unit 23.

In step S54, the control unit 23 scans to create image data, and transmits the rearrange of image processing together with the image data to the I/O service device 50A.

In step S55, when the I/O service device 50A receives the rearrange request, immediately preceding image data and the cropped image become unnecessary, so the communication unit 56 identifies the storage destination URL information and requests deletion of the temporary storage file to the temporary file storage service device 50B.

In step S56, when the communication unit 61 of the temporary file storage service device 50B receives the deletion request of the temporary storage file, the data storage unit 62 deletes the image data and the cropped image.

In steps S57 to S60, the temporary file storage service device 50B transmits the success of deleting the temporary file to the device 20 via the I/O service device 50A.

As a result, the device 20 and the information processing system 50 perform the processes of steps S3 to S33 again, and the device 20 displays the image cropped from the image data obtained by re-scanning the receipt (scanning the original) on the screen 302.

The process execution system 100 repeats the processes of steps S3 to S60 until an operation for starting a subsequent process using the cropped image 312, such as pressing of the start button 322 in FIG. 6A (6) is received. After receiving the operation for starting the subsequent process, the process execution system 100 starts the subsequent process described above. Therefore, whether or not to perform reprocessing in the device 20 can be accepted before the process execution system 100 executes all the processing. The correction process and the combining process of the cropped images 312 in steps S43 to S51 is not essential and may be omitted. However, since the cropped image 312 can be easily modified according to the user's operation on the device 20 by the processing of steps S43 to S51, it is possible to save the trouble of correcting the image after subsequent processes such as after receiving the cropped image 312 by email.

In FIGS. 6A, 6B, 6C, 7AA, 7AB, 7BA, 7BB, 7CA, and 7CB, an application in which the device 20 scans the receipt and the I/O service device 50A automatically crops is described as an example. Another example of the application for printing is described below.

Figure 8:
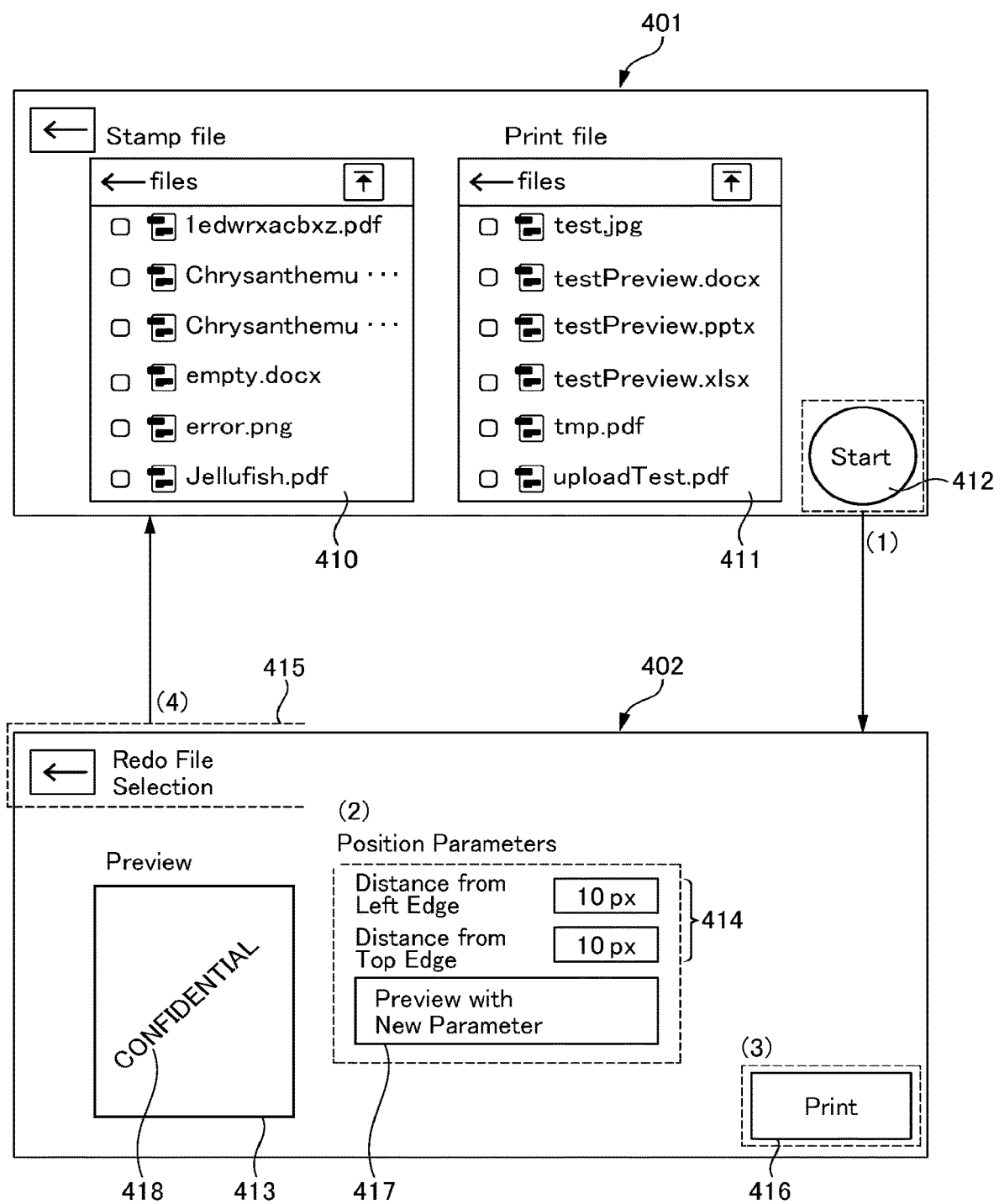
FIG. 8 is a diagram illustrating an example of a screen displayed on the control panel of the device.

FIG. 8 illustrates an example of a screen displayed on the control panel 940 of the device 20. The example of FIG. 8 is an application in which the user selects data stored on the external cloud storage service 70 and a stamp to be added to the data and the device 20 prints the data. Since the serial numbers (1) to (4) have been assigned to the main operations, each operation is described below.

(1) A screen 401 is a screen for selecting a file to be printed and a stamp. (A list of files stored in the external cloud storage service 70 is displayed.) The user selects a file containing a stamp image in a stamp file browse 410 on the left side of the screen 401, and a PDF file to be printed and to be stamped in a print file browse 411 on the right side of the screen (an example of a first process). When the user presses a start button 412 with the above described files selected, the device 20 transitions to a screen 402 for acquiring a preview (stamped image described below).

(2) On the screen 402, the preview of the file to be printed and the stamp is displayed in a preview window 413. The preview displayed in the preview window 413 is created by the I/O service device 50A (an example of a second process). The user can confirm the position of the stamp 418. When correcting the position of the stamp, the user designates position parameters 414 (an example of the first process) and presses a preview with new parameter button 417. As a result, the device 20 acquires the preview from the I/O service device 50A again and displays the preview on the screen 402.

(3) If the preview is as expected, the user presses a print button 416. The device 20 prints a previewed image.

(4) If the file selection is incorrect, the user presses the redo file selection button 415 to redo the file selection. The screen returns to the screen 401.

As described above, it is possible to reprocess the selection of the file or the stamp before the device 20 prints, or to accept the setting of the stamp position again. In the past, printing was performed directly from the screen 402, but in this case, reprinting may be required due to an incorrect selection of a file or stamp, an incorrect position of the stamp, or the like. In the present embodiment, the processing result (preview of the stamped image) of the I/O service device 50A can be displayed, and whether or not to reprocess can be received by the device 20.

Figure 9A:
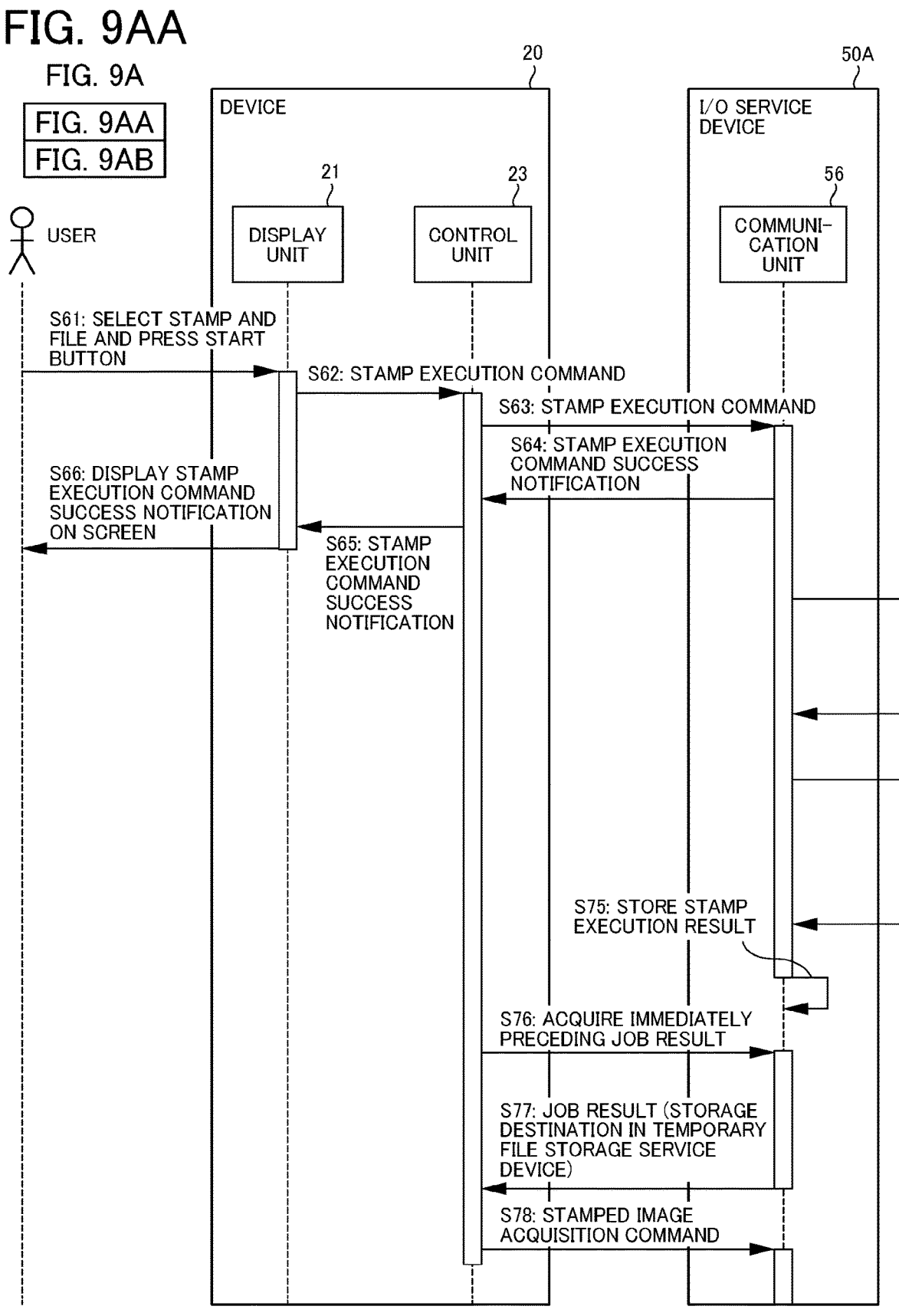
FIGS. 9AA and 9AB are sequence diagrams illustrating a process up to a preview display of a file on which a stamp is formed.
Figure 9A:
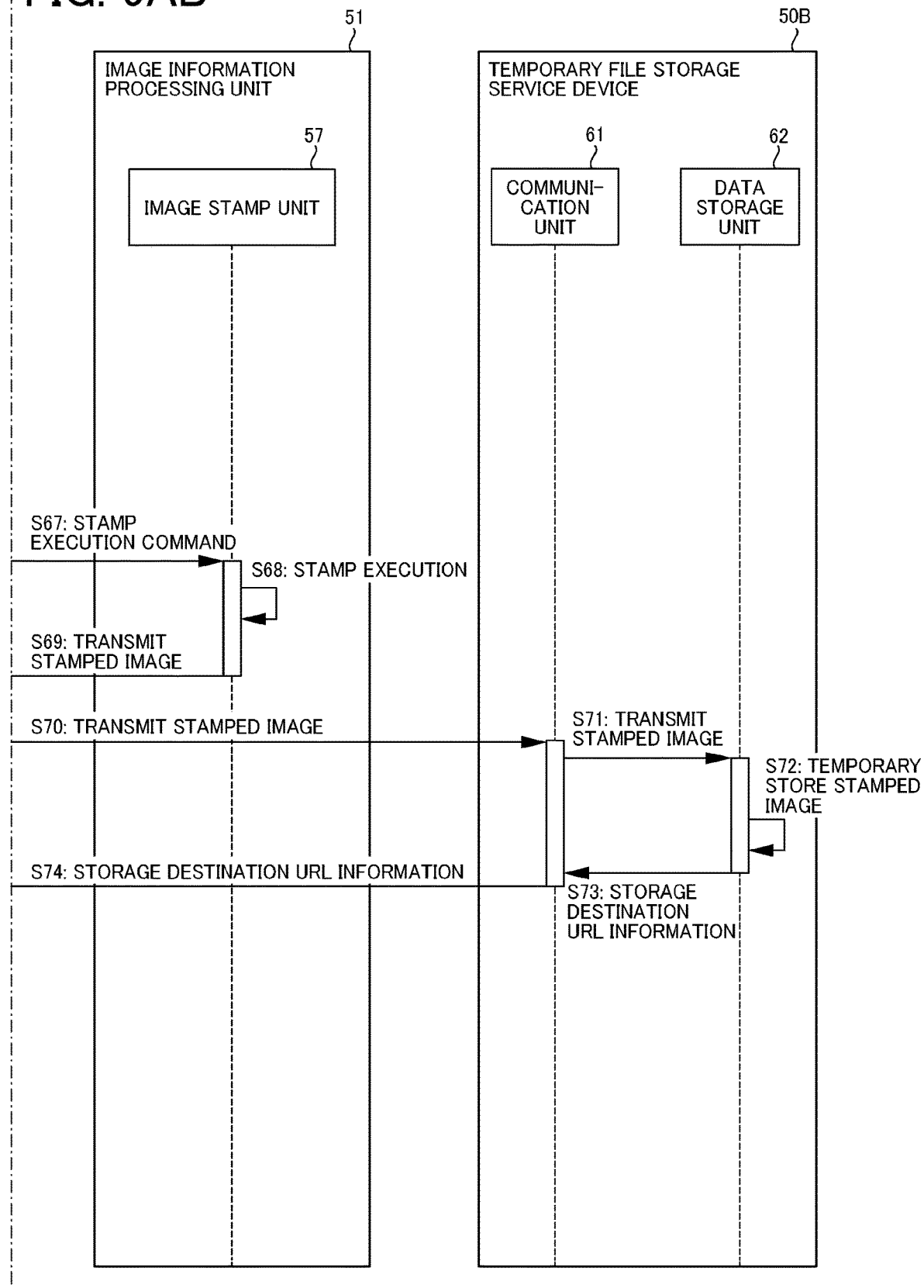

With reference to FIGS. 9AA, 9AB, 9BA, and 9BB, a process of creating a preview of a file having a stamp by the process execution system 100 and accepting from the user whether or not the user sets the device 20 after seeing the preview is described. FIGS. 9AA, 9AB, 9BA, and 9BB are sequence diagrams illustrating a process up to a preview display of a file on which a stamp is formed.

In step S61, the user selects a stamp file and a print file on the screen 401 and presses the start button 412. The input reception unit 22 receives the above described inputs.

In step S62, the display unit 21 designates a stamp file and a print file and transmits a stamp execution command to the control unit 23.

In step S63, the control unit 23 transmits the stamp execution command to the I/O service device 50A.

In step S64, since the image processing is executed asynchronously, the communication unit 56 of the I/O service device 50A immediately returns a success notification to the device 20.

In step S65, the control unit 23 transmits the received success notification to the display unit 21.

In step S66, the display unit 21 displays the stamp execution command notification screen on the control panel 940 in order to feed back the success notification to the user.

Step S67 and subsequent steps are image processing performed asynchronously. First, the communication unit 56 designates the stamp file and the print file and transmits the stamp execution command to the image stamp unit 57.

In step S68, the image stamp unit 57 adds the image of the selected stamp file on the selected print file. That is, the stamp image is superimposed on the print image of the file for printing.

In step S69, the image stamp unit 57 transmits the stamped image to the I/O service device 50A.

In step S70, the communication unit 56 of the I/O service device 50A transmits the stamped image to the temporary file storage service device 50B.

In step S71, the communication unit 61 of the temporary file storage service device 50B receives the stamped image and transmits the stamped image to the data storage unit 62.

In step S72, the data storage unit 62 temporarily stores the stamped image.

In steps S73 and S74, the data storage unit 62 transmits storage destination URL information of the stamped image to the I/O service device 50A via the communication unit 61.

In step S75, the communication unit 56 of the I/O service device 50A stores the storage destination URL information as a stamp job execution result.

In step S76, the control unit 23 of the device 20 inquires (polls) the I/O service device 50A of an immediately preceding job execution result in order to acquire the result of the image processing executed asynchronously. Alternatively, the control unit 23 receives a notification from the I/O service device 50A indicating completion of the image processing.

In step S77, the control unit 23 acquires the job execution result including the storage destination URL information from the I/O service device 50A.

In steps S78 to S83, the control unit 23 acquires the stamped image from the temporary file storage service device 50B using the storage destination URL information.

In step S84, the control unit 23 transmits the stamped image to the display unit 21.

In step S85, the display unit 21 displays the stamped image on the control panel 940. As a result, the screen 402 is displayed.

In step S86, if the stamp position of the displayed preview, the file for printing, or the stamp itself is not what was expected, the user presses the redo file selection button 415 to select the file again. Alternatively, the stamp position is changed by changing the position parameters 414 of the screen 402. Then, the user presses the preview with new parameter button 417. The input reception unit 22 receives a file selection and a stamp position.

In steps S87 and S88, the device 20 acquires a new stamped image. This process may be the same as in steps S63 to S84.

In step S89, the display unit 21 displays the stamped image on the control panel 940. As a result, the screen 402 is updated.

In step S90, when the user wants to print the displayed stamped image on the device 20, the user presses the print button 416. The input reception unit 22 receives pressing of the button.

In step S91, the display unit 21 transmits a stamped image print command to the control unit 23.

Figure 9B:
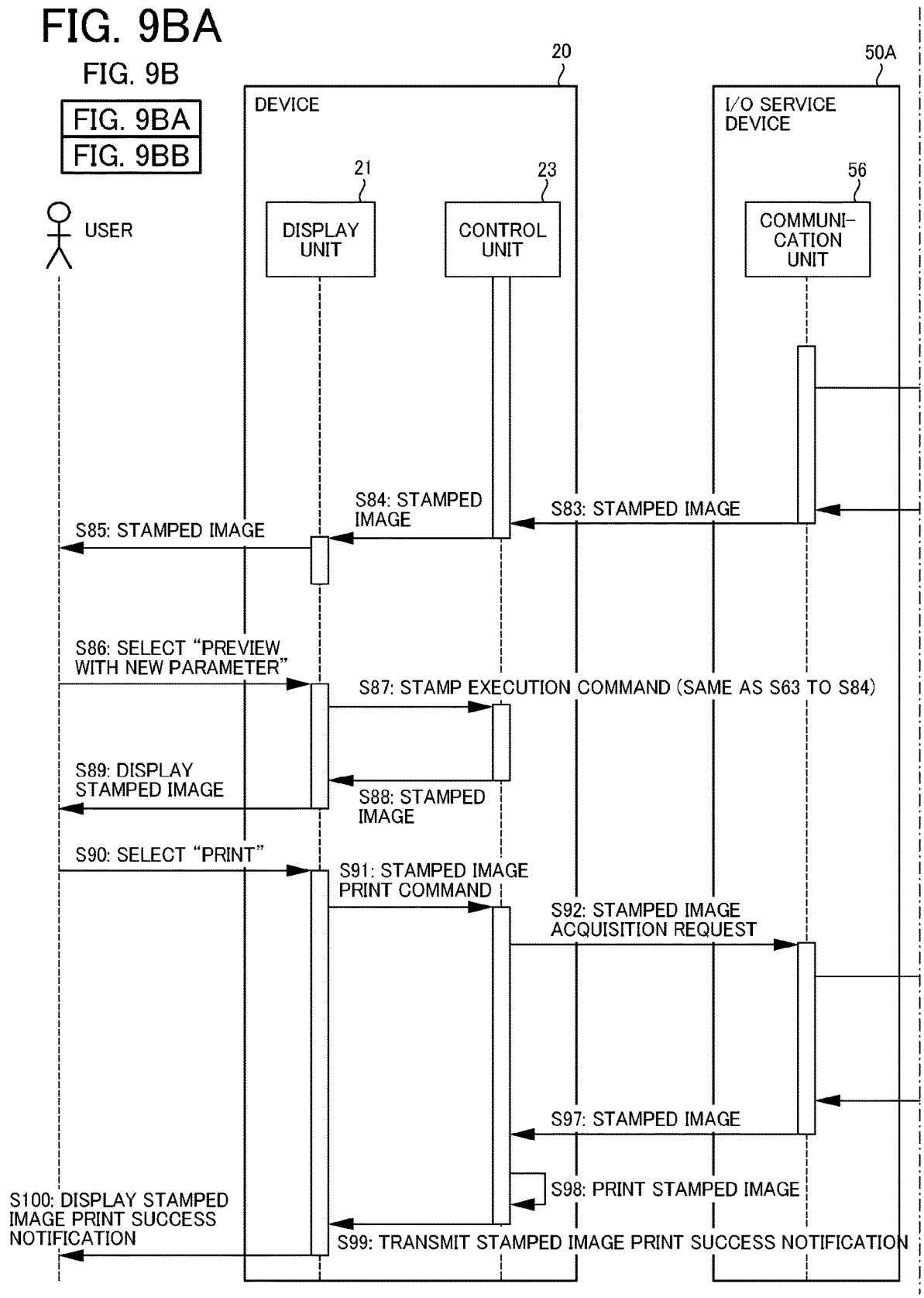
FIGS. 9BA and 9BB are sequence diagrams illustrating the process up to the preview display of the file on which the stamp is formed.

In steps S92 to S97, the control unit 23 acquires the stamped image from the temporary file storage service device 50B using the storage destination URL information. In FIGS. 9BA and 9BB, the I/O service device 50A is used. Alternatively, the device 20 may directly communicate with the temporary file storage service device 50B.

In step S98, the control unit 23 prints the acquired stamped image.

In step S99, the control unit 23 transmits a print success notification to the display unit 21.

In step S100, the display unit 21 displays a success notification screen for printing the stamped image.

As described above, the device 20 accepts whether or not to perform reprocessing on the device 20 even in the print application before the process execution system 100 executes all the processing.

As described above, in the process execution system of the present embodiment, the processing result (cropping of the receipt) of the information processing system 50 based on the processing (scanning) of the device 20 is displayed on the device 20. Therefore, the user can determine whether or not to perform the processing of the device 20 that may cause a processing failure in the information processing system 50, again. Further, since the processing result (generation of the stamped image) of the information processing system 50 based on the processing of the device 20 (file selection, stamp position setting) is displayed on the device 20, the user can determine whether or not to perform the processing of the device 20 that may cause the processing failure in the information processing system 50 again.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, the configuration example illustrated in FIG. 5 is divided according to the main functions in order to facilitate understanding of the processing by the device 20, the information processing system 50, and the temporary file storage service device 50B. The present disclosure is not limited by the way of dividing the processing unit or the name. The processing of the device 20, the information processing system 50, and the temporary file storage service device 50B can be divided into more processing units according to the processing content. Further, the processing unit may be divided so that one processing unit includes more processing.

The apparatuses described in the examples are merely an illustration of one of several computing environments for implementing the embodiments disclosed herein. In some embodiments, information processing system 50 includes multiple computing devices, such as a server cluster. The plurality of computing devices are configured to communicate with one another through any type of communication link, including a network, shared memory, etc., and perform the processes disclosed herein.

Further, the information processing system 50 may be configured to share the disclosed processing steps, for example, FIGS. 7AA, 7AB, 7BA, 7BB, 7CA, 7CB, 9AA, 9AB, 9BA, and 9BB in various combinations. For example, a process executed by a given unit may be executed by a plurality of information processing devices included in the information processing system 50. Further, the information processing system 50 may be integrated into one server device or may be divided into a plurality of devices.

Each function of the embodiments described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device comprising:
   circuitry configured to:
   request an information processing system to perform a second process using a result of a first process executed by the device;
   display on a display, a result of the second process acquired from the information processing system; and
   receive a request for the device to execute the first process again,
   wherein when the first process is scanning of a plurality of images at once and the second process is cropping of each image from image data generated by the scanning and transmission of each cropped image to the outside, and when a request to combine cropped images of a plurality of receipts is received,
   the circuitry is further configured to acquire the cropped images of the plurality of receipts that are candidates for combining from the information processing system, and
   the circuitry is further configured to display on the display with priority the cropped images of the plurality of receipts that are the candidates for combining.

2. The device of claim 1, wherein
when the request for executing the first process again is received, the circuitry is further configured to execute the first process again.

3. The device of claim 2, wherein:
the second process includes a plurality of processes; and
the circuitry is configured to display on the display, the result of the second process before all the plurality of processes are executed.

4. The device of claim 2, wherein:
when the first process is scanning of a document and the second process is image processing of image data generated by the scanning and transmission of the image data to the outside,
the circuitry is configured to:
display on the display the result of the image processing acquired from the information processing system;
scan the document again and request the information processing system to execute the second process when the request to execute the scanning again is received; and
transmit the image data to the information processing system when a request to transmit the image data to the outside is received.

5. The device of claim 4, wherein
when the first process is the scanning of a plurality of images at once and the second process is the cropping of each image from the image data generated by the scanning and transmission of each cropped image to the outside, the circuitry is configured to:
display on the display each cropped image acquired from the information processing system; and
scan the plurality of images again, the plurality of images whose arrangement has been changed, when a request to execute the scanning again is received.

6. The device of claim 5, wherein the circuitry is configured to:
display the cropped images selected from cropped images of all receipts in each of a plurality of fields for displaying the cropped images of the receipts; and
receive the combining of a plurality of cropped images displayed in the plurality of fields.

7. The device of claim 5, wherein the circuitry is configured to:
display on the display a calendar icon together with the cropped image;
display on the display a calendar when pressing of the calendar icon is received; and
when pressing of a date on the calendar is received, receives the date as a file name of the cropped image.

8. The device of claim 2, wherein
when the first process is selecting a stamp image and a file, and the second process is generating a stamped image of the file on which the stamp image is superimposed, the circuitry is configured to:
display on the display the stamped image acquired from the information processing system;
display on the display a selection screen of the stamp image and the selection screen of the file again when request for selecting the stamp image and selecting the file is received again;
acquire the stamped image using one of a received stamp image and a received file from the information processing system again;
display on the display the stamped image again; and
print the stamped image when a request for printing of the stamped image is received.

9. The device of claim 8, wherein
the first process further includes receiving a selection of a position of the stamp image, and
the circuitry is configured to:
display on the display the stamped image acquired from the information processing system;
receive the selection of the position of the stamp image again;
acquire the stamped image from the information processing system, generated based on a received position of the stamp image;
display on the display the stamped image again; and
when the printing of the stamped image is received, print the stamped image.

10. A process execution system comprising:
an information processing system; and
a device that requests the information processing system to execute a second process using a result of a first process in the device, the device including circuitry configured to:
display on a display a result of the second process acquired from the information processing system; and
receive input for executing the first process in the device again, and
the information processing system comprising:
another circuitry configured to transmit to the device, a result of executing the second process using a result of the first process executed again,
wherein when the first process is scanning of a plurality of images at once and the second process is cropping of each image from image data generated by the scanning and transmission of each cropped image to the outside, and when a request to combine cropped images of a plurality of receipts is received,
the circuitry is further configured to acquire the cropped images of the plurality of receipts that are candidates for combining from the information processing system, and
the circuitry is further configured to display on the display with priority the cropped images of the plurality of receipts that are the candidates for combining.

11. A process execution method executed by a device that requests an information processing system for executing a second process using a result of a first process by the device, the method comprising:
displaying on a display a result of the second process acquired from the information processing system; and
receiving input for executing the first process again in the device,
wherein when the first process is scanning of a plurality of images at once and the second process is cropping of each image from image data generated by the scanning and transmission of each cropped image to the outside, and when a request to combine cropped images of a plurality of receipts is received,
the method further comprises acquiring the cropped images of the plurality of receipts that are candidates for combining from the information processing system, and
the method further comprises displaying on the display with priority the cropped images of the plurality of receipts that are the candidates for combining.

12. A non-transitory recording medium storing a plurality of instructions which, when executed by one or more processors, causes the processors to perform the process execution method of claim 11.

* * * * *